US006633677B1

(12) United States Patent
Dube et al.

(10) Patent No.: US 6,633,677 B1
(45) Date of Patent: Oct. 14, 2003

(54) METHOD AND APPARATUS FOR PROCESSING AN IMAGE IN AN IMAGE COMPRESSION/DECOMPRESSION SYSTEM THAT USES HIERACHICAL CODING

(75) Inventors: Simant Dube, San Diego, CA (US); Li Hong, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/475,367

(22) Filed: Dec. 30, 1999

(65) Prior Publication Data
(65)

(51) Int. Cl.[7] .................................................. G06K 9/36
(52) U.S. Cl. ........................ 382/238; 382/236; 382/239
(58) Field of Search ................................. 382/238, 239, 382/232, 236, 300, 299, 248, 160, 244; 348/607, 448, 452, 553, 451

(56) References Cited

U.S. PATENT DOCUMENTS

| | | | |
|---|---|---|---|
| 5,048,105 A | 9/1991 | Adachi | 382/232 |
| 5,577,132 A | 11/1996 | Yokose et al. | 382/238 |
| 5,654,737 A | 8/1997 | Der et al. | 345/113 |
| 5,659,370 A | 8/1997 | Mancuso et al. | 348/620 |
| 5,680,179 A | 10/1997 | D'Alto et al. | 348/607 |
| 5,729,357 A | 3/1998 | Funada et al. | 348/451 |
| 5,751,860 A | 5/1998 | Su et al. | 382/244 |
| 5,828,789 A | 10/1998 | Yokose et al. | 382/239 |
| 5,859,931 A | 1/1999 | Fan et al. | 382/238 |
| 5,889,562 A | 3/1999 | Pau | 348/447 |
| 5,903,671 A | 5/1999 | Toda | 382/236 |
| 5,929,918 A | 7/1999 | Marques Pereira | 348/448 |
| 5,953,465 A | 9/1999 | Saotome | 382/300 |
| 5,960,116 A | 9/1999 | Kajiwara | 382/238 |
| 5,963,678 A | 10/1999 | Nozawa | 382/299 |
| 5,970,169 A | 10/1999 | Ittner | 382/160 |
| 5,999,656 A | 12/1999 | Zandi et al. | 382/248 |
| 6,021,227 A * | 2/2000 | Sapiro et al. | 382/239 |

FOREIGN PATENT DOCUMENTS

JP 409252410 A * 9/1997 .......... H04N/1/417

OTHER PUBLICATIONS

Calzone et al., "Video Compression by Mean–Corrected Motion Compensation of Partial Quadtrees", IEEE Transactions on Circuits and Systems for Video Technology, Feb. 1997, vol. 7, No. 1, pp. 86–96.*

Dasarathy, "Life (Linear Features) Preserving Filters", IEEE Proceedings, Apr. 1990, vol. 3, pp.867–872.*

(List continued on next page.)

Primary Examiner—Anh Hong Do
(74) Attorney, Agent, or Firm—Lisa K. Jorgenson; James H. Morris

(57) ABSTRACT

A component of an image processor receives at least a portion of one or more reconstructed versions of an image including a causal context of an object pixel of the image, and provides a prediction for the object pixel computed as a weighted sum according to at least one measure of correlation and a weighting policy. A component receives a first prediction of an object pixel and reconstructed versions of an image, and provides a second prediction for the object pixel in accordance with the first prediction for the object pixel and a substantially mean error for the context. A component receives one or more prediction differences versions of the image including a causal context prediction difference of an object prediction difference of the image, and provides a prediction for the object prediction difference computed as a weighted sum according to at least one measure of correlation and a weighting policy.

8 Claims, 19 Drawing Sheets

OTHER PUBLICATIONS

Hong et al., "An Edge Preserving Image Interpolation System for a Digital Camcorder" IEEE Transactions on Consumer Electronics, vol. 42, No. 3, Aug. 1996, pp. 279–284.

Akeley and Jermoluk, "High Performance Polygon Rendering" Computer Graphics, vol. 22, No. 4, Aug. 1988, pp. 239–245.

Voorhies et al., "Virtual Graphics" Computer Graphics, vol. 22, No. 4, Aug. 1988, pp. 247–253.

Queiroz et al., "Nonexpansive Pyramid for Image Coding Using A Nonlinear Filterbank" IEEE Transactions On Image Processing, vol. 7, No. 2, Feb. 1998, pp. 246–252.

Xiaolin Wu, "Context–Based, Adaptive, Lossless Image Coding" IEEE Transactions on Communications, vol. 45, No. 4, Apr. 1997, pp. 437–444.

Xiaolin Wu, "High–Order Context Modeling and Embedded Conditional Entropy Coding of Wavelength Coefficients for Image Compression" downloaded from website www.csd.uwo.ca/faculty/wu/ (ECECOW).

Morris Goldberg, "Comparative Performance of Pyramid Data Structures for Progressive Image Transmission" IEEE Transactions on Communications, vol. 39, No. 4, Apr. 1991, pp. 540–548.

Seemann et al., "Generalized Locally Adaptive DPCM" Technical Report No. 97/301, Monash University, Mar. 1997, 15pp., downloaded from website www.csse.monash.edu.au/~torsten/publications.shtml (No. 1).

Claypoole, Jr. et al., "Nonlinear Wavelet Transforms for Image Coding via Lifting" submitted to IEEE Transactions on Image Processing, 1999 (August) downloaded from website www.cm.bell–labs.com/who/wim/ (Papers 4 Lifting).

Brian Apgar et al., "A Display System for the Stellar™ Graphics Supercomputer Model GS1000™" Computer Graphics, vol. 22, No. 4, Aug. 1988, pp. 255–262.

Alain Fournier et al., "Constant–Time Filtering with Space–Variant Kernels" Computer Graphics, vol. 22, No. 4, Aug. 1988, pp. 229–238.

Alex D. Kelley et al., "Terrain Simulation Using a Model of Stream Erosion" Computer Graphics, vol. 22, No. 4, Aug. 1988, pp. 263–268.

Demetri Terzopoulos et al., "Modeling Inelastic Deformation: Viscoelasticity, Plasticity, Fracture" Computer Graphics, vol. 22, No. 4, Aug. 1988, pp. 269–278.

John C. Platt et al., "Constraint Methods for Flexible Models" Computer Graphics, vol. 22, No. 4, Aug. 1988, pp. 279–288.

Printout of list of research and selected publications by Xiaolin Wu downloaded from website www.csd.uwo.ca/faculty/wu/ (ECECOW).

* cited by examiner

METHOD AND APPARATUS FOR PROCESSING AN IMAGE IN AN IMAGE COMPRESSION/DECOMPRESSION SYSTEM THAT USES HIERACHICAL CODING

RELATED ART

An image generally involves an extremely large amount of data. Consequently, images are often coded to reduce the amount of data needed to represent the image, for example prior to storage or transmission. Such coding is commonly referred to as image to compression. Image compression is commonly used in medical imaging, image archiving, aerial imaging, video, and computer generated document systems.

Some image compression systems use hierarchical coding or data structures, e.g., pyramid data structures to represent the image. With such image compression systems, a user may select the image data, out of the hierarchical coded image data, which matches the definition of the user's own monitor.

In addition to hierarchical coding, image compression systems may also employ prediction encoding methods. Prediction encoding methods may involve predicting a pixel value of a target or object pixel from peripheral pixel values, determining a prediction error, and performing entropy encoding of a prediction error.

SUMMARY

In accordance with a first aspect of the invention, a method and apparatus for use in processing an image receives data representative of at least a portion of one or more reconstructed versions of the image including data representative of a causal context of an object pixel of the image. The method and apparatus uses a plurality of predictors to generate a plurality of predictions for the object pixel and to generate a plurality of predictions for at least one pixel of the causal context, determines at least one measure of correlation between the plurality of predictions for the at least one pixel of the causal context and the data representative of the causal context, and provides a prediction for the object pixel computed as a weighted sum in accordance the at least one measure of correlation and a weighting policy.

In accordance with a second aspect of the invention, a method and apparatus for use in processing an image receives data representative of a first prediction of an object pixel and receives data representative of a plurality of reconstructed versions of an image including data representative of two or more causal contexts of the image from two or more resolutions of the image. The method and apparatus determines a context from the two or more causal contexts, and determines a substantially mean error for the context, and provides a second prediction for the object pixel in accordance with the data representative of the prediction for the object pixel and the substantially mean error for the context.

In accordance with a third aspect of the invention, a method and apparatus for use in processing an image receives data representative of one or more prediction differences versions of the image including data representative of a causal context prediction difference of an object prediction difference of the image. The method and apparatus uses a plurality of predictors to generate a plurality of predictions for the object prediction difference and to generate a plurality of predictions for at least one prediction difference of the causal context, determines at least one measure of correlation between the plurality of predictions for the at least one prediction difference and the data representative of the causal context prediction difference, and provides a prediction for the object prediction difference computed as a weighted sum in accordance the at least one measure of correlation and a weighting policy.

In accordance with a fourth aspect of the invention, a method and apparatus for use in processing an image receives data representative of a prediction of an object prediction difference and receives data representative of a plurality of reconstructed versions of an image including data representative of two or more causal contexts of the image from two or more resolutions of the image. The method and apparatus determines a context for the two or more causal contexts, and determines a substantially mean error for the context. The method and apparatus provides a prediction for the object prediction difference in accordance with the data representative of the prediction for the object prediction difference and the substantially mean error for the context.

These and other objects, features and advantages of the present invention will be apparent in view of the drawings, description and claims hereinbelow.

DETAILED DESCRIPTION

Figure 1:
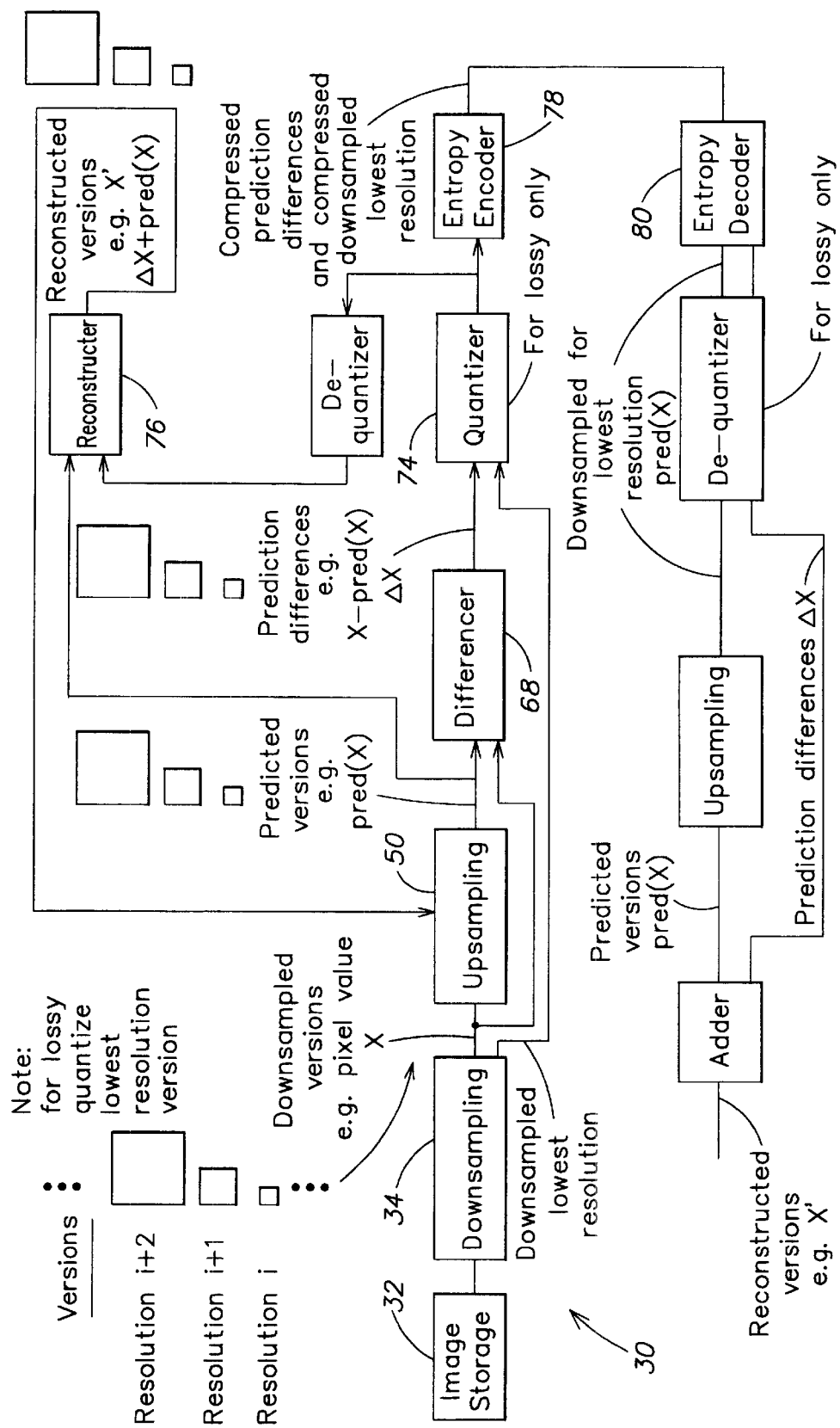
FIG. 1 is a schematic block diagram of a system for compressing and decompressing an image.

FIG. 1 is a schematic block diagram of a system 30 for compressing and decompressing an image. The image may, but need not be, a portion of a larger image. The image may be formed of a plurality of picture elements, e.g., pixels.

The image is represented by image data, which may be stored in a storage device 32. The image data may have any form, including but not limited to, a plurality of pixel values, e.g., digital codes, wherein each pixel value represents an associated one of the plurality of pixels in the image.

In this embodiment, the system 30 comprises a plurality of subroutines, or modules, each of which includes a plurality of instructions to be executed by a processor.

Figure 2A:
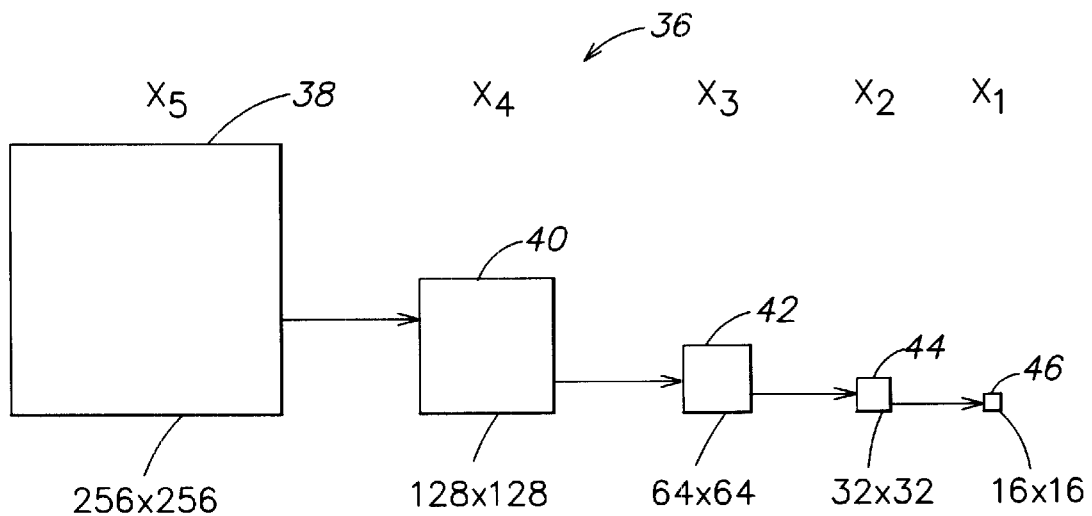
FIG. 2A is a representation of data sets of various resolutions generated by downsampling in one embodiment of the system of FIG. 1.

The system 30 includes an encoding portion and a decoding portion. The encoding portion includes a downsampling module 34, which receives the image data and produces a hierarchy of data sets (or versions), for example as illustrated in FIG. 2A. Referring to FIG. 2A, a hierarchy of data sets 36 is sometimes referred to as a pyramid data structure or a multi-resolution data structure. Each data set in the hierarchy 36 represents a lower resolution version of the image than that of the immediately preceding data set in the hierarchy 36. The hierarchy of data sets 36 in FIG. 2 includes the image data 38, e.g., having a resolution of 256×256, and a series of four data sets, i.e., a data set 40 having a resolution of 128×128, a data set 42 having a resolution of 64×64, a data set 44 having a resolution of 32×32, and a data set 46 having a resolution of 16×16. The data set 46 representing the lowest resolution version of the image is designated $X_1$, the data set 44 representing the next highest resolution of the image is designated $X_2$ . . . , and so forth. The version having the highest resolution typically has a greater number of pixels than any of the other data sets. The version having the lowest resolution typically has the smallest number of pixels.

Figure 2B:
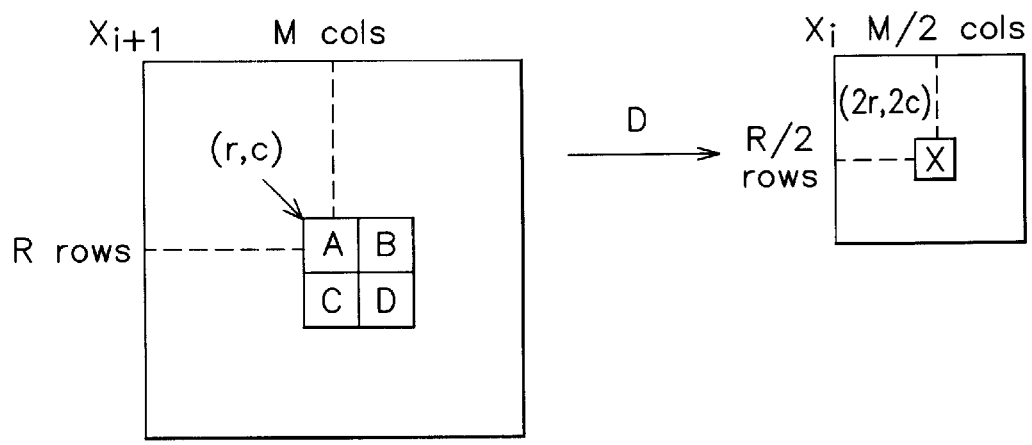
FIG. 2B is a representation of downsampling in one embodiment of the downsampling module of the system of FIG. 1.

FIG. 2B illustrates a manner in which downsampling is carried out in one embodiment. Data set $X_{i+1}$ has pixels A, B, C, D. Coordinates r,c represent the row and column coordinates of pixel A. A data set $X_i$ is a lower resolution version of data set $X_{i+1}$. Image $X_i$ has a single pixel, X, to represent pixels A, B, C, D in image $X_{i+1}$.

Two methods for determining X include a skip method and an average method. For the skip method, pixel X is determined according to equation (1):

$$X = A \quad \text{(eq. 1)}$$

On the other hand, for the average method, pixel X is determined according to equation (2):

$$X = (A+B+C+D)/4 \quad \text{(eq. 2)}$$

The skip and average methods result in a nonexpansive pyramid data structure (i.e., the total amount of transform coefficients are as many as pixels in the original image). However, any other downsampling methods may also be used. The downsampling factor may be, but is not limited, to a factor of two (2), as illustrated in FIG. 2B, so as to help minimize complexity of the system.

Figure 3A:
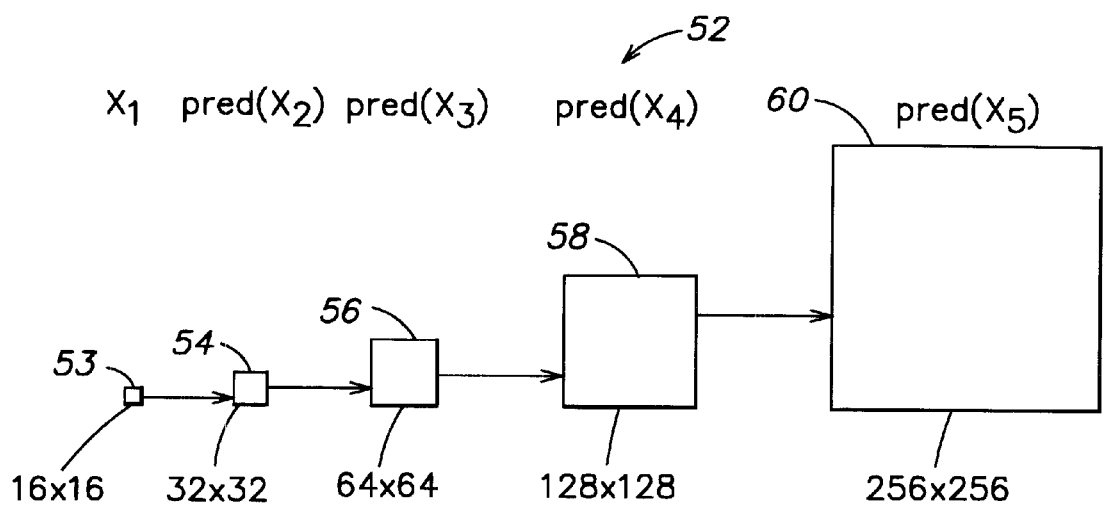
FIG. 3A is a representation of data structures of various resolution by generated by upsampling in one embodiment of the system of FIG. 1.

Referring again to FIG. 1, the data sets generated by the downsampling module 34, e.g., x, are supplied to an upsampling module 50, which produces a hierarchy of data sets, for example as illustrated in FIG. 3A. Referring to FIG. 3A, each data set in the hierarchy 52 represents a higher resolution version of the image than that of the immediately preceding data set in the hierarchy 52. The hierarchy 52 includes a data set 53 having a resolution of 16×16 and a series of four data sets, i.e., a data set 54 having a resolution of 32×32, a data set 56 having a resolution of 64×64, a data set 58 having a resolution of 128×128, and a data set 60 having a resolution of 256×256. In this embodiment, the upsampling module uses image data of one resolution, beginning with the image of lowest resolution, i.e., $X_1$ to generate interpolated image data, referred to herein as predicted data, e.g., pred(X), for a next higher resolution image. The data set 53 representing the lowest resolution version of the image is designated $X_1$, the data set representing the prediction for the next highest resolution is designated pred($X_2$) and so forth.

Image compression methods are sometimes classified as lossless or lossy. The latter method can cause a decoded image to visually degrade depending on the compression rate. If doing lossy compression, the image $X_1$ may be quantized by dividing each pixel by $Q/2^N$, where Q is a quantization parameter and N is the number of hierarchical levels including the original level. No quantization is typically performed in the case of a lossless compression system. The system of FIG. 1 may provide either lossy or lossless compression.

Figure 3B:
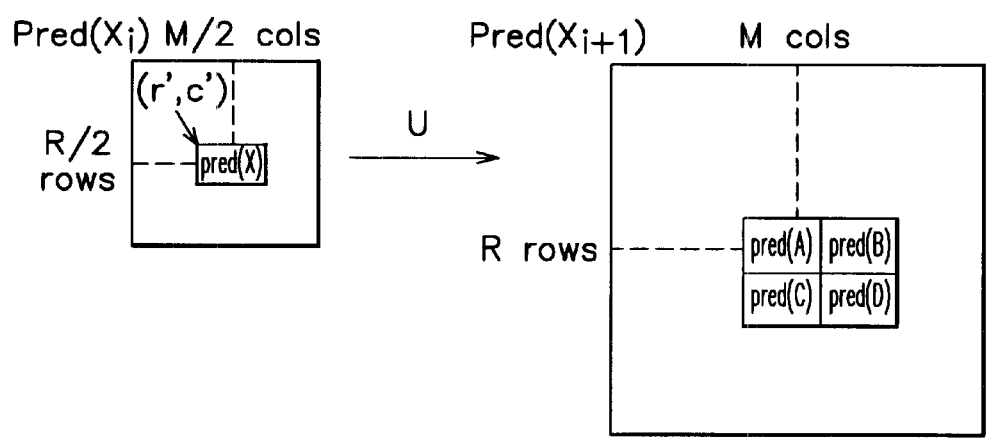
FIG. 3B is a representation of upsampling in one embodiment of the upsampling module of the system of FIG. 1.

FIG. 3B illustrates upsampling as carried out in one embodiment. A quantized image is denoted by Pred($X_i$). Pred($X_{i+1}$) has a next higher resolution than that of Pred($X_i$). The upsampling module use the image data of image Pred ($X_i$) to generate interpolated image data for a next higher resolution image Pred($X_{i+1}$). For example, coordinates r',c' represent the row and column coordinates of a quantized pixel denoted pred(X) in Pred($X_i$). Quantized pixels pred (A), pred(B), pred(C), pred(D) in Pred($X_{i+1}$) are interpolated from quantized pixel pred(X).

Any other upsampling method may be also used including but not limited to not an adaptive nonlinear method (for example, a method disclosed in patent application titled, "Method and Apparatus for Processing an Image" by Dubet et al., attorney docket S1022/8237, filed on same date herewith, and incorporated by reference herein.)

Figures 4A, 4B:
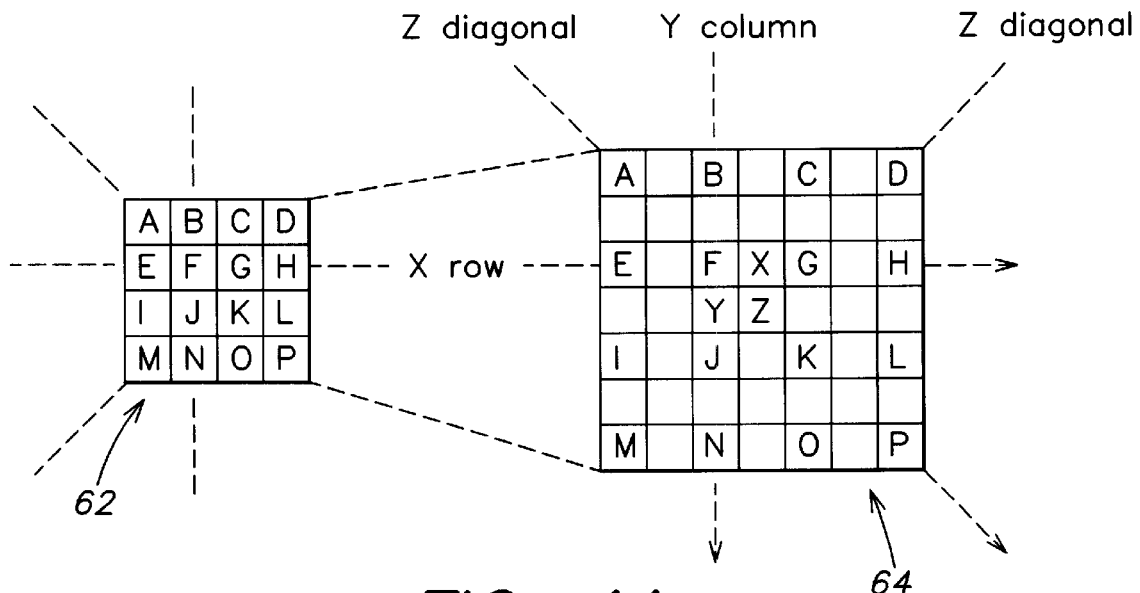
FIG. 4A is a representation of a portion of an image having one resolution and a portion of a next higher resolution image formed therefrom.
FIG. 4B is a representation of an arrangement of prediction differences in one embodiment.

FIG. 4A shows a portion an image 62 having one resolution and a portion of a next higher resolution image 64 formed therefrom. The portion of the lower resolution image 62 includes pixels A through P. The portion of the higher resolution image 64 includes pixels A through P corresponding to pixels A through P in the portion of the lower resolution image 62. The portion of the higher resolution image 64 further includes three pixels X, Y, Z representing the pixels currently to be interpolated to generate the higher resolution image 64. The pixels X, Y, Z are just a few of the pixels that form the interposed rows and columns of the higher resolution image 64 and which are to be interpolated to generate the higher resolution image 64. Other pixels to be interpolated are represented by empty squares in the higher resolution image 64.

Referring again to FIG. 1, the predicted data, e.g., pred (X), is supplied to a differencer module 68, which generates data indicative of differences between the downsampled data and the predicted data. The differences are referred to herein as prediction differences. For example, the differencer module 68 may receive the data for $X_{i+1}$ (FIG. 2) and $Pred(X_{i+1})$ (FIG. 3) and compute prediction differences ΔB, ΔC, and ΔD using equations (3), (4), and (5), respectively:

$$\Delta B = B\text{-pred}(B) \qquad (\text{eq. 3})$$

$$\Delta C = C\text{-pred}(C) \qquad (\text{eq. 4})$$

$$\Delta D = D\text{-pred}(D) \qquad (\text{eq. 5})$$

If using the skip or the average methods, described above, it may not be necessary to provide ΔA, because the decoder portion of the system, described below, may determine ΔA based on B, C, and D.

FIG. 4B shows an arrangement of prediction differences 70 in one embodiment. Any other arrangement of prediction differences may also be used. For example, in another embodiment, all ΔBs may be arranged together, all ΔCs may be arranged together, and all ΔDs may be arranged together.

In the case of lossy compression, prediction differences from the differencer 68 are supplied to a first input of a quantizer 74. The quantizer 74 further includes a second input that receives the image of lowest resolution from the downsampling module 34. The quantizer 74 quantizes the prediction differences and the image of lowest resolution using, for example, a factor $Q/2^{N-I-1}$, where I is the hierarchical level being quantized. Note that using such a factor causes the amount of quantization to depend on the hierarchical level being predicted.

The quantized prediction differences and the quantized lowest resolution image are supplied to a reconstructer 76, which further receives the predicted versions, e.g, pred(X), and provides reconstructed versions, e.g., X'.

The quantized prediction differences and the quantized image of lowest resolution are supplied to an entropy encoder 78, which may be any type of entropy coder including but not limited to a Huffman coder or arithmetic coder. The entropy encoder 78 encodes the information to achieve compression and transmits the encoded information.

The transmitted information is received by a decoder 80 in the decoding portion of the system 30. The decoding portion of the system is typically symmetrical with, but operating reverse to the encoding portion of the system 30. In this embodiment, the decoder 80 determines the values as follows:

$$B'' = \Delta B + \text{pred}(B) \qquad (\text{eq. 6})$$

$$C'' = \Delta C + \text{pred}(C) \qquad (\text{eq. 7})$$

$$D'' = \Delta D + \text{pred}(D) \qquad (\text{eq. 8})$$

If the downsampling module 34 used the skip method, then pixel A may be determined according to equation (9):

$$A'' = \text{pred}(X) \qquad (\text{eq. 9})$$

If the downsampling module 34 used the average method, then pixel A may determined according to equation (10):

$$A'' = 4*\text{pred}(X) - (B'' + C'' + D'') \qquad (\text{eq. 10})$$

For the lossless case X"=X, A"=A, B"=B, C"=C, D"=D

These steps may be repeated for the next resolution and so on for each of the other resolutions.

Figure 5:
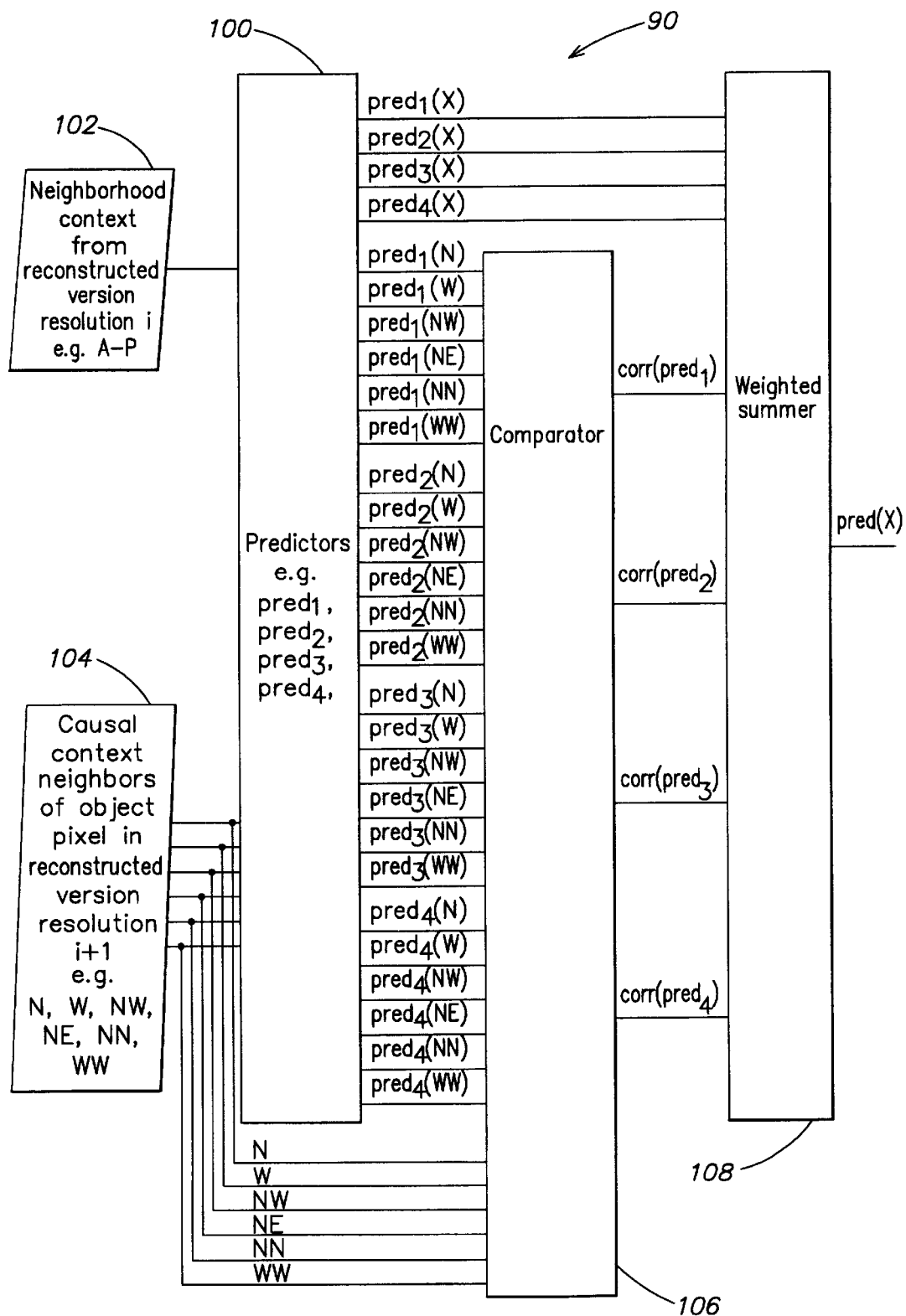
FIG. 5 is a schematic block diagram of an upsampling module according to one embodiment of a first aspect of the present invention.
Figure 6:
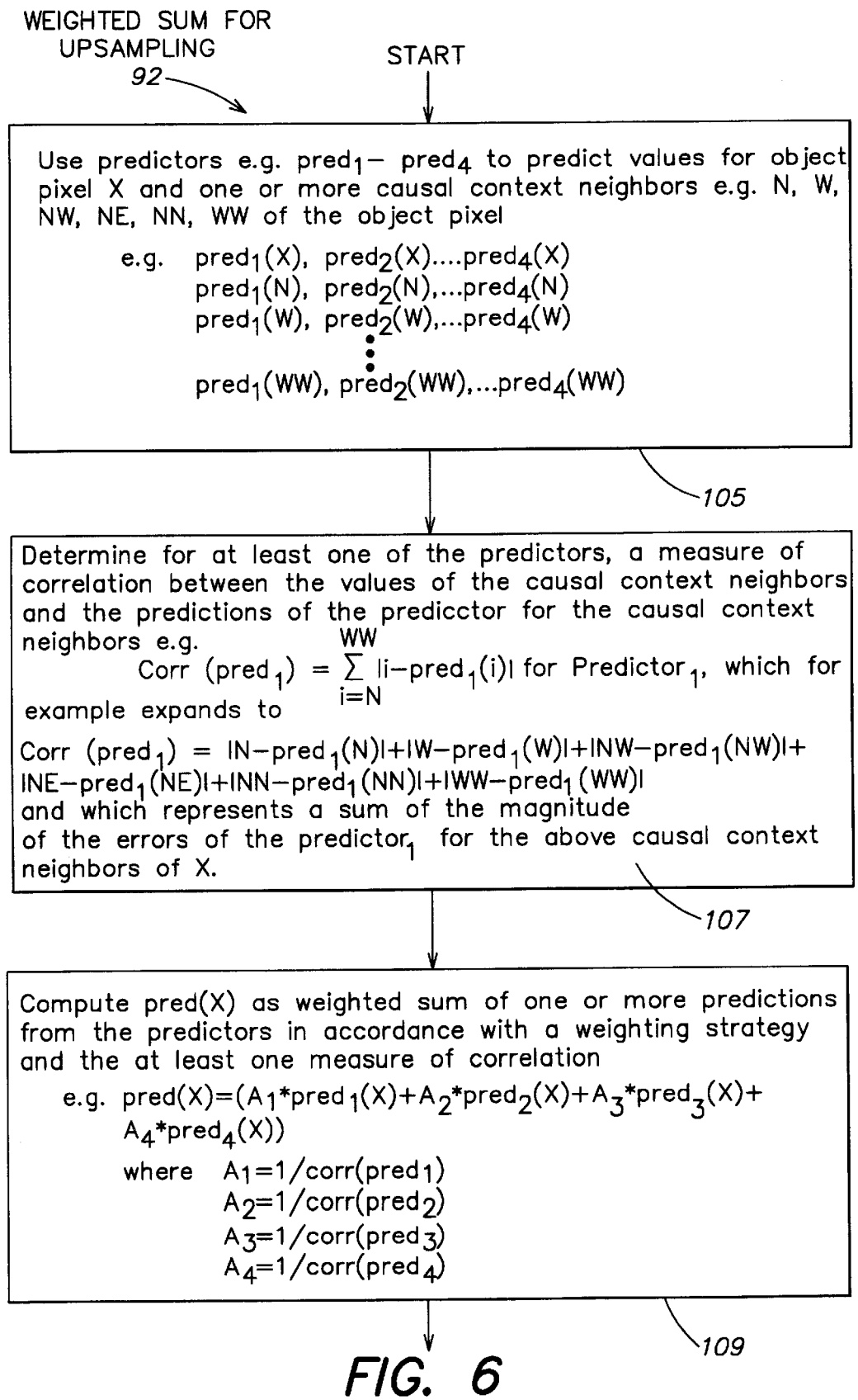
FIG. 6 is a flow chart diagram of one embodiment of the upsampling module of FIG. 5.
Figure 7A:
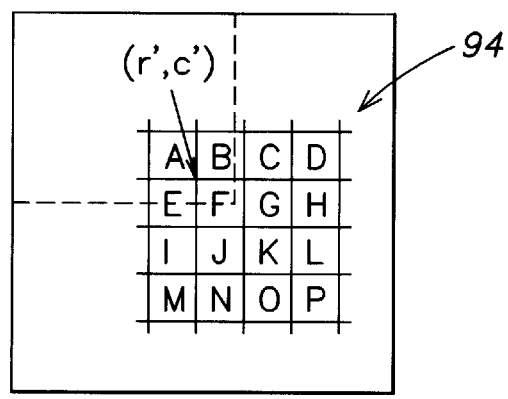
FIG. 7A is a representation of pixels in a reconstructed previous resolution version.

FIG. 5 illustrates an upsampling module 90 according to one embodiment of a first aspect of the present invention. FIG. 6 illustrates a flow chart 92 for one embodiment of the upsampling module 90 of FIG. 5. The upsampling module 90 may be conceptualized as predicting a higher resolution, e.g., i+1, from a lower resolution, e.g., i. That is, the upsampling module 90 determines a value of a pixel X (e.g., at coordinates (r,c) in a next resolution) on the basis or a neighborhood, or neighborhood context. In this embodiment, the neighborhood context may comprise a neighborhood context in the previous resolution and a neighborhood context in the current resolution. FIG. 7A shows one embodiment of a neighborhood context 94 of a previous resolution. The neighborhood context includes sixteen (16) pixels. If r'=r/2, c'=c/2 (with integer division), then the sixteen pixels as shown in FIG. 7A may form a 4×4 block centered at (r',c'). Because the neighborhood context is from a previous resolution, the neighborhood context is causal. The term causal context means that the values of the context are determined prior to determining the value of object pixel X. In this embodiment the upsampling module 90 (FIG. 5) makes use of the values in the reconstructed version of the neighborhood context (e.g., from the reconstructor 76 (FIG. 1)).

Figure 7B:
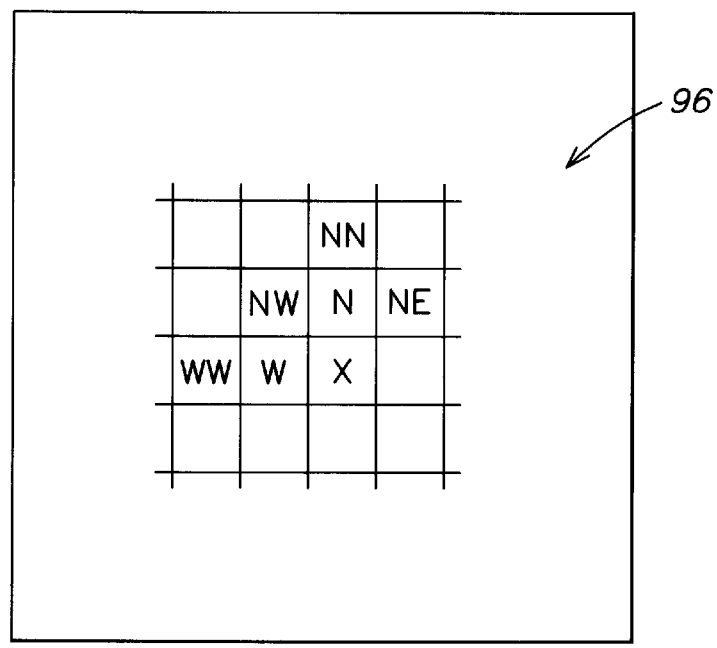
FIG. 7B is a representation of pixels in a current resolution version undergoing processing to generate a prediction for an object pixel.

FIG. 7B shows one embodiment of a causal neighborhood context 96 of a current resolution. The neighborhood context includes six (6) pixels that neighbor the object pixel X and form a causal neighborhood context at the same resolution as X. The pixels forming the causal neighborhood context 96 in this embodiment include a pixel N (i.e., "North" of X), W (i.e., "West" of X), NW (i.e., "North-West" of X), NE (i.e., "North-East" of X), NN (i.e.,"North-North" of X), WW (i.e., "West-West" of X). The causal neighborhood context 96 is one commonly available if using a normal raster scan. In this embodiment, the upsamnpling module 90 (FIG. 5) makes use of the values in the reconstructed version of the neighborhood context (e.g., from the reconstructor 76 (FIG. 1)).

A "context" often refers to a combination of pixel value or values of adjoining pixel or pixels. The pixels in the neighborhoods shown in FIG. 7A adjoin one another (as do the pixels in the neighborhood shown in FIG. 7B) and are approximately centered about the pixel X. However, the terms "neighborhood of pixels", and "neighborhood context of pixels", as used herein, are not limited to adjoining pixels, any particular neighborhood, any particular pattern or shape, or any positional relation to a pixel or pixels being interpolated, and may represent any combination of pixels.

Referring again to FIG. 5, the upsampling module 90 includes a predictor module 100. The predictor module 100 has a first input that receives the data 102 indicative of the neighborhood context from the reconstructed version of resolution i (e.g., A–P (FIG. 7A)). The predictor module has a second input that receives the data 104 indicative of the causal neighborhood context from the reconstructed version of i+1 (e.g., N, W, NW, NE, NN, WW (FIG. 7B)). Any type of reconstructor, reconstructed values, and reconstruction order and/or scanning sequence may be used.

The predictor module 100 uses a plurality of predictors to generate predicted values for an object pixel, e.g., X, in an image and to predict values for one or more causal context neighbors of the object pixel, as described below (see step 105 (FIG. 6)). The predictors may have any form including, but not limited to rules, processes, functions, formulas, equations, look up tables, mappings, etc., or any combination thereof. The predictors may reference any pixel values, for example the pixels may have any positional relation to the pixel or pixels being interpolated. The predictors may be obtained from any source; for example, the predictors may be specified by designers of the system, by one of the users of the system or by anyone or anything else or an) combination thereof. Predictors may be predetermined or may be determined dynamically. One set of predictors may be uniformly applied to an image, or a set of predictors used for one portion of the image may be different than that used for one or more of the other portions of the image and/or that used for other images.

As stated above, one or more predictors may be used. Example predictors include but are not limited to:

(note that example predictors 1–8 refer to pixels shown in FIG. 7B; example predictors 9–13, 15 refer to pixels shown in FIG. 7A.)
1. N
2. W
3. NW
4. NE
5. N+W-NW
6. Min (N,W), if NW>=max(N,W)

Max(N,W), if NW<=min(N,W)

N+W-NW, else
7. 2N-NN
8. 2W-WW
9. G
10. J
11. K
12. bilinear interpolation: e.g., use (F+G)/2 if interpolated pixel is at position X of FIG. 4A; (F+J)/2 if interpolated pixel is at position Y of FIG. 4A; (F+G+J+K)/4 if interpolated pixel is at position Z of FIG. 4A.
13. Cubic interpolation of A,B, . . . , P, pixels; which may be but need not be two dimensional and may but need not include all pixels, e.g., if interpolated pixel is at position X of FIG. 4A use cubic1(E,F,G,H); if interpolated pixel is at position Y of FIG. 4A use cubic1(B,F,J,N), if interpolated pixel is at position Z of FIG. 4A use cubic1(cubic1(A,B,C,D), cubic1(E, F,G,H), cubic1(I,J,K,L), cubic1(M,N,O,P)), and where cubic1$X_1,X_2,X_3,X_4$)=(-$X_1$+9$X_2$+9$X_3$-$X_4$)/16.
14. Adaptive zooming algorithm
15. Any non-linear predictor, e.g., a median filter that performs a median interpolation of IFGJK and/or a weighted median of one or more of A–P, for example if interpolated pixel is at position X of FIG. 4A use median(F,G,median(B,C,F,G), median(F,G,J,K)); if interpolated pixel is at position Y of FIG. 4A use median(F,J,median(E,F,I,J), median(F,G,J,K)); if interpolated pixel is at position Z of FIG. 4A use median(F,G,J,K); and where median($X_1,X_2,X_3, X_4$)= ($X_1+X_2+X_3+X_4$-max ($X_1,X_2,X_3,X_4$)-min($X_1,X_2, X_3$,X4))/2.

In this embodiment, the predictor module 100 has four predictors, e.g., $Pred_1$–$Pred_4$ which are used to predict values for object pixel x and values for one or more causal context neighbors e.g., N, W, NW, NE, NN, WW (FIG. 7B) of the object pixel. Note however, that the causal context neighbors need not be those in FIG. 7B.

The predictor module 100 has a plurality of outputs that provide indications of the predicted values, determined by the predictors, for the object pixel, e.g., $pred_1$(X), $pred_2$(X) . . . $pred_4$(X), The predictor module 100 also has a plurality of outputs that provide indications of the predicted values, determined by the predictors, for the one or more causal context neighbors of the object pixel, e.g., $pred_1$(N), $pred_2$(N), . . . pred4(N)
$pred_1$(W), $pred_2$(W), . . . pred4(W)
$pred_1$(NW), $pred_2$(NW), . . . pred4(NW)
$pred_1$(NE), $pred_2$(NE), . . . pred4(NE)
$pred_1$(NN), $pred_2$(NN), . . . pred4(NN)
$pred_1$(WW), $pred_2$(WW), . . . pred4(WW)

The predictions for the one or more causal context neighbors are supplied to an input of a comparator module 106, which determines, for at least one of the predictors, a measure of correlation between the reconstructed values of the causal context neighbors and the predictions of the predictor for the causal context neighbors (see step 107 (FIG. 6)). The measure of correlation may be determined in any manner, and may have any form. For example, the measure of correlation may be an absolute sense, or relative to one or more other predictors or any other measure, or any combination thereof. The measure of correlation may for example be any measure of correlation including but not limited to a difference, a ratio or an absolute value. In this embodiment, the comparator module uses equation (1):

$$Corr(pred_1) = \sum_{i=N}^{WW} |i - pred_1(i)| \text{ for } Predictor_1, \qquad \text{eq. (11)}$$

which expands to Corr($pred_1$)=|N-$pred_1$(N) |+|W-$pred_1$(W) |+|NW-$pred_1$(NW) |+|NE-$pred_1$(NE)|+|NN-$pred_1$(NN)|+ |WW-$pred_1$(WW)|, and which represents a sum of the magnitude of the errors of the predictor, for the above causal context neighbors of X, where the symbol | 51 represents absolute value. Note that each of the terms in equation (11) can be computed by the decoder since the neighbors are causal.

The comparator module 106 has a plurality of outputs that provide indications of the measures of correlation, denoted corr($pred_1$), corr($pred_2$), corr($pred_3$), corr($pred_4$), which are supplied to a weighted summer module 108. A weighted summer is disclosed in T. Seeman and P. E. Tischer, "Generalized locally adaptive DPCM," Technical Report No. 97/301, Monash University, Australia, March 1997, which is incorporated by reference herein.

The weighted summer module 108 has an output that provides an indication, denoted pred(X), computed as weighted sum of one or more of the predictions in accordance with a weighting strategy and the at least one measure of correlation (see step 109 (FIG. 6)). The weighting strategy may be any strategy to influence, set, establish, determine, cause, effect, and/or control a decision to use or not to use one or more of the predictions from the predictors and/or the weighting of the predictions from the predictors.

The weighting strategy may have any form including, but not limited to rules, processes, functions, formulas, equations, look up tables, mappings, etc., or any combination thereof. Many kinds of weighting strategies may be provided, and the invention is not limited to any particular weighting, strategy. The weighting strategy may be obtained from any source; for example, the weighting strategy may be specified by designers of the system, by one of the users of the system or by anyone or anything else or any combination thereof. The weighting strategy may be predetermined or may be determined dynamically. The weighting strategy may be uniformly applied to an image, or a weighting strategy used for one portion of the image may be different than that used for one or more of the other portions of the image and/or that used for other images. Example weighting strategies include but are not limited to: choosing the most accurate, choosing more than one but less than all on the basis of the respective accuracy of each, using predetermined weights using dynamically determined weights (e.g., assigning weights inversely proportional to error), and combinations thereof The weighting strategy in this embodiment is expressed by equation (12)

$$\text{pred}(X)=(A_1*\text{pred}_1(X)+A_2*\text{pred}_2(X)+A_3*\text{pred}_3(X)+A_4*\text{pred}_4(X))\quad(12)$$

The weights $A_1$, $A_2$, $A_3$, $A_4$, may, but need not, be determined adaptively, e.g. as the reciprocal of the error sum:

$A_1 = 1/\text{corr}(\text{pred}_1)$
$A_2 = 1/\text{corr}(\text{pred}_2)$
$A_3 = 1/\text{corr}(\text{pred}_3)$
$A_4 = 1/\text{corr}(\text{pred}_4)$ In addition, the prediction may be normalized, e.g., $$\text{pred}(X)=(A_1*\text{pred}_1(X)+A_2*\text{pred}_2(X)+\ldots)/\text{sum}(A_1 A_2 \ldots) \quad \text{eq. (13)}$$

In another embodiment, one prediction may be selected and, used to generate the prediction, for example as expressed by equation (14):

$$\text{pred}(X)=\text{pred}_K(X) \text{ where } E_K=\min\{E_1, E_2, \ldots\} \quad \text{eq. (14)}$$

In such embodiment, the weights of the non-selected predictions are essentially zero.

Figure 8:
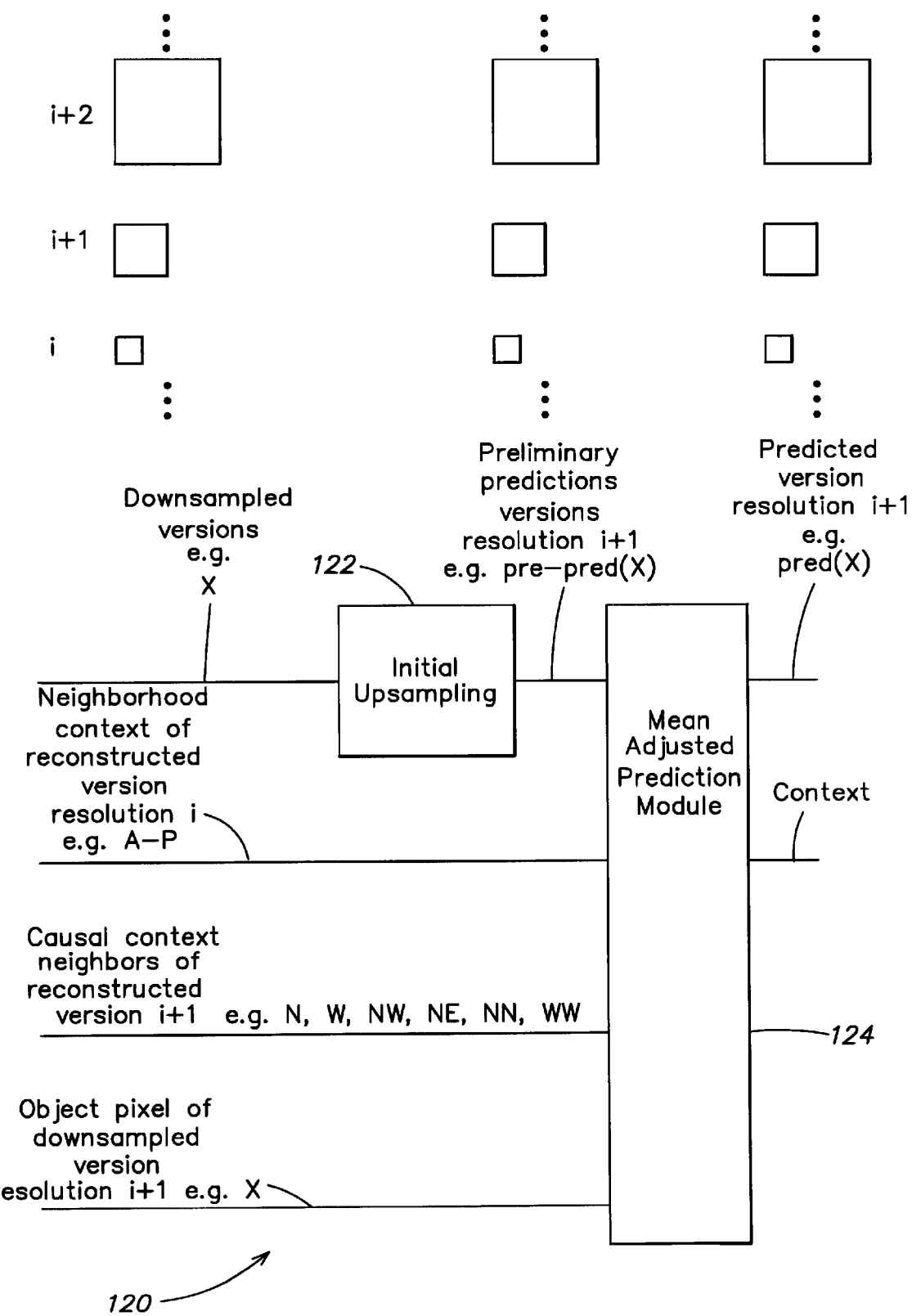
FIG. 8 is a schematic block diagram of an upsampling module according to one embodiment of a second aspect of the present invention.

FIG. 8 is a schematic block diagram of an upsampling module 120 according to one embodiment of a second aspect of the present invention.

In this embodiment, the predictions may be further processed. The additional processing may enhance compression by reducing redundancy in the predictions, however, such advantage is not intended as a limitation on the present invention.

The upsampling module 120 includes an initial upsampling module 122, which may be any type of upsampling module and may employ any type of upsampling methods, including but not limited to any of the upsampling modules and methods described above.

The initial upsampling module 122 has an input that receives doxwnrsamiipled data, e.g., X. The initial upsampling module 122 has an output that provides an indication of an initial prediction, which is supplied to a first input of a mean adjusted prediction module 124. Mean adjusted prediction is disclosed in X. Wu and N. Memon, "Context-based, adaptive, lossless image coding," IEEE Trans. On Comm., Vol. 45, No. 4, pp. 437–444, April 1997, which is incorporated by reference herein. The mean adjusted prediction module 124 has a second input that receives data representative of a neighborhood context of the reconstructed version of resolution i, (the previous resolution), e.g., A–P (FIG. 7A), a third input that receives data representative of causal context neighbors of reconstructed version of resolution i+1, e.g., (FIG. 7B), and data indicative of the object pixel of the downsampled version of resolution i+1, e.g., X. The resolution i+1 is the resolution being predicted. The mean adjusted prediction module 124 has a first output that provides a prediction, e.g., pred(X), and has a second output that provides data indicative of the context.

Figure 9:
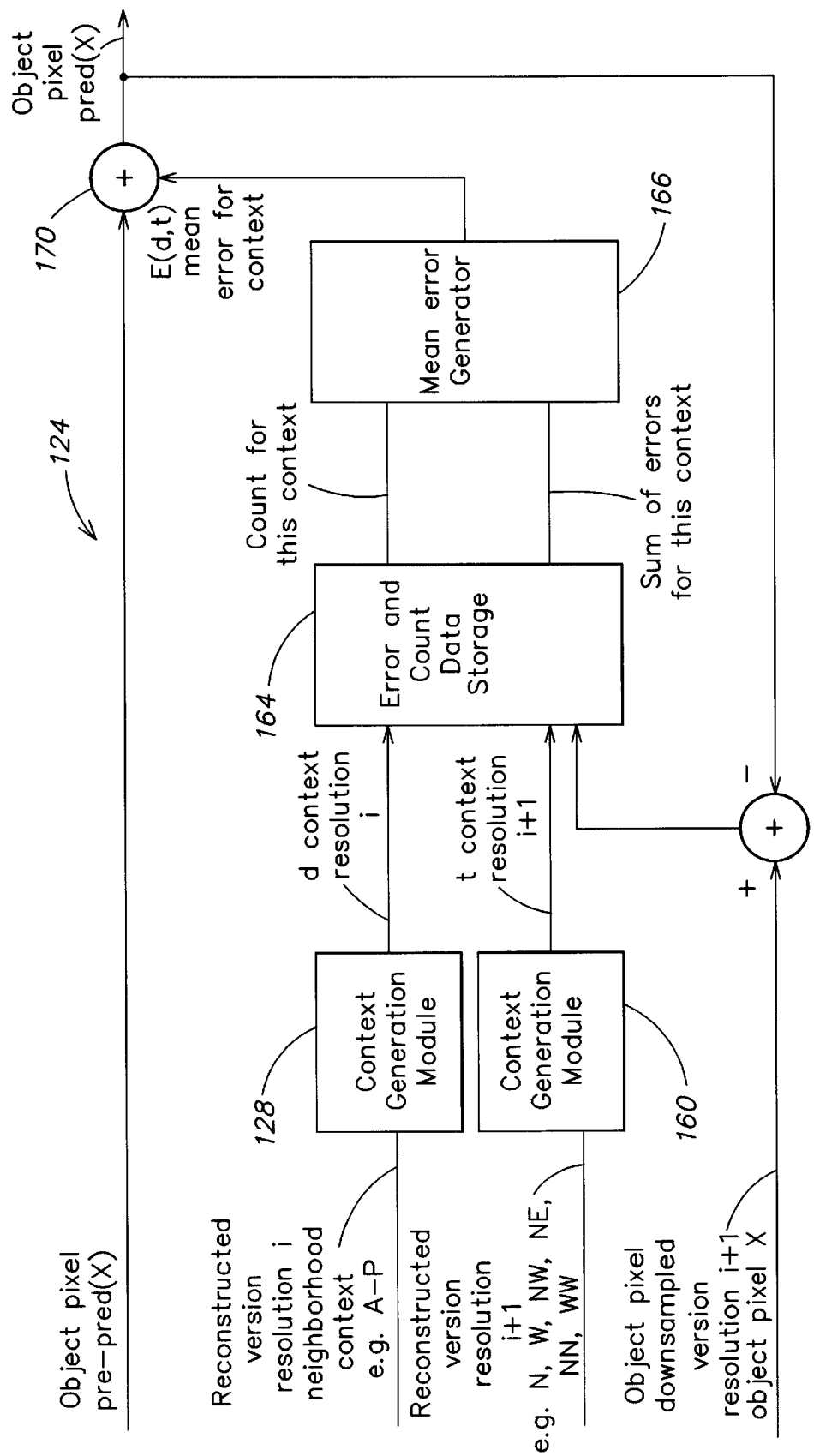
FIG. 9 is a schematic block diagram of the prediction mean adjustment module of FIG. 8.
Figure 11:
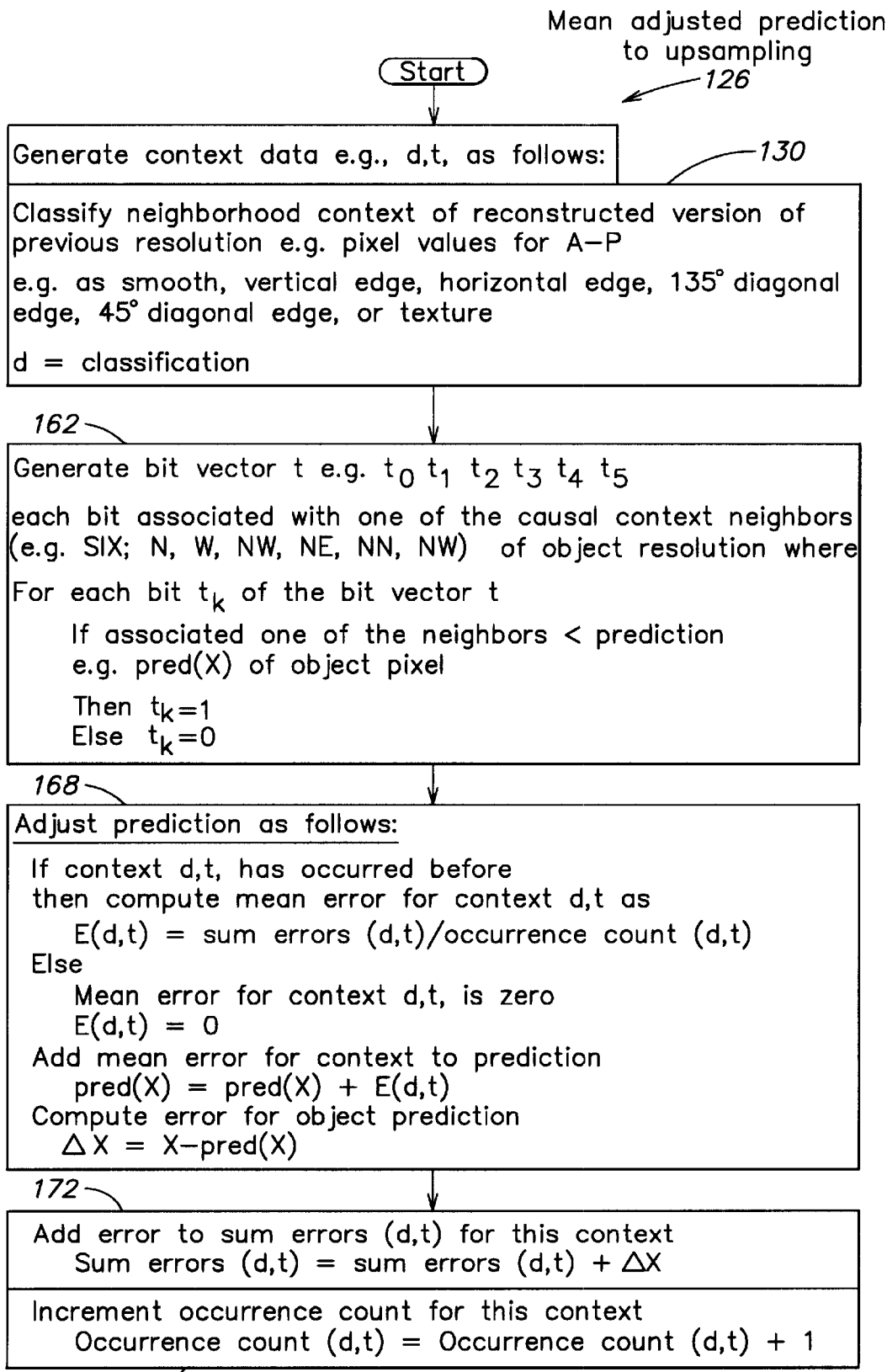
FIG. 11 is a flow chart diagram of one embodiment of the prediction mean adjustment module of FIG. 8

The FIG. 9 is a schematic block diagram of the mean adjusted prediction module 124 of FIG. 8. FIG. 11 is a flow chart diagram 126 of one embodiment of the mean adjusted prediction module 124 of FIG. 8.

Referring now to FIG. 9, the mean adjusted predication module 124 includes a first context generation module 128 which receives the data representative of a neighborhood context of the reconstructed version of resolution i, (the previous resolution) e.g., A–P (FIG. 7A). The first context generation module 128 generates data indicative of a context by classifying the neighborhood context of the reconstructed version, e.g., pixel values for A–P (FIG. 7A).

As used herein, the term classify means to determine an indication of a classification in accordance with one or more criterion. The one or more criterion may have any form including, but not limited to rules, processes, finctions, formulas, equations, look up tables, mappings, etc., or any combination thereof. Classification criteria may be obtained from any source; for example, the classification criteria may be specified by designers of the system, by one of the users of the system or by anyone or anything else or any combination thereof. Classification criteria may be predetermined or may be determined dynamically. One set of classification criteria may be uniformly applied to each image portion to be classified, or a set of classification criteria used for one portion of the image may be different than that used for one or more of the other portions of the image and/or that used for other images.

Figure 10:
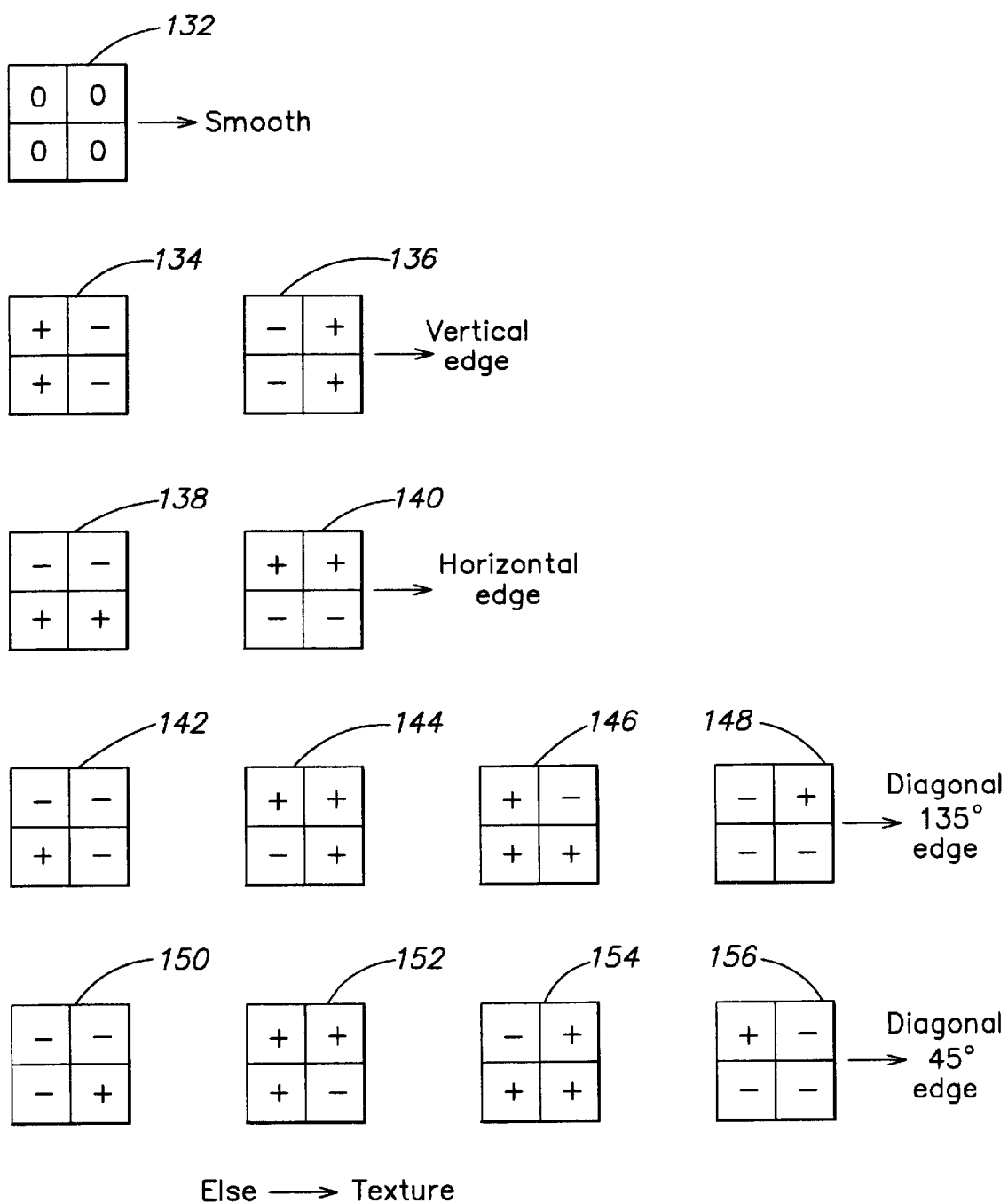
FIG. 10 is a representation of contexts and classifications of the contexts in one embodiment of the invention.

FIG. 10 is a representation of contexts and classifications of the contexts used in one embodiment. The first context generation module may use the following convention to classify the 2×2 block consisting of pixels F, G, J, K (FIG. 7A) (see step 130 (FIG. 11)). Compute the mean (m) of F, G, J, K. Mark each of F, G, J and K as +, if it is more than m+e, where e is a small positive value. Mark each of F, G, J and K as—if it is less than m−e. Mark each of F, C, J and K as 0 if it is neither greater than m+e or less than m−e. If F, G, J, K all are marked 0, i.e., (0,0,0,0) then classify the 2×2 block as smooth (see context 132 (FIG. 10)). If F, G, J, K are marked as (+,−,+,−) or (−,+,−,+), classify the block as vertical edge (see contexts 134, 136 (FIG. 10)). If it is (−,−,+,+) or (+,+,−,−), classify the block as horizontal edge (see contexts 138, 140 (FIG. 10)). If it is (+,+,−,+), (+,−,+,+), (−,−,+,−), (−,+,−,−), then classify the block as a diagonal 135 degree edge (see contexts 142–148 (FIG. 10)). If it is(−,−,−,−,+), (+,+,+,−), (−,+,+,+), or (+,−,−,−), then classify the block as a diagonal 45 degree edge (see contexts 150–156, (FIG. 10)). If the marks for the block do not fall into any of the above categories, then classify the block as texture. Thus, there are 6 classifications: smooth, texture, and 4 types of edges. The first context generation module has an output that provides an indication of the classification, denoted as d.

Classifications such as smooth texture and edge are well–known. Smooth commonly refers to a region having a high degree of correlation. Texture typically refers to a region having variations. An edge is commonly considered a boundary between two or more distinguishable regions. For example, in an image of a person's head, the forehead may be considered smooth, the hair may be considered texture, and the boundary between the forehead and the hair may be considered an edge.

Any other convention may also be used. In this embodiment, it may be desirable to implement the comparator with special purpose hardware for use in pattern matching. Suitable values for e may be determined empirically to provide the desired results for the types of images expected. In one embodiment, the value of e may be zero, but the value of e is not limited to such.

The mean adjusted prediction module 124 further include a second context generation module 160 having an input that receives the data representative of the causal context neighbors of reconstructed version of resolution i+1, e.g., N, W, NW, NE, NN, WW (FIG. 7B). The second context generation module 160 has an output that provides an indication, denoted t, of the context of these causal context neighbors. In one embodiment, the context of these causal context neighbors is determined as described below (see step 162 (FIG. 11)). Generate bit vector t e.g., $t_0t_1t_2t_3t_4t_5$, where each bit is associated with one of the causal context neighbors (e.g., N, W, NW, NE, NN, NW) in the reconstructed version of object resolution, and where each bit $t_K$ of the bit vector t has a value determined as follows if the value of the associated one of the reconstructed neighbors<prediction e.g., pred(X) of object pixel, then $t_K=1$, otherwise, $t_K=0$.

The indications d and t represent a context denoted by C(d,t). Note that there are a total of $6 \times 2^6 = 384$ contexts. The indications d and t are supplied to an error and count data storage module 164. The error and count data storage module 164 has an output that provides an indication of a sum of errors for this context and an indication of an occurrence count for this context, which are supplied to a mean error generator module 166. The mean of the prediction errors seen at all previous pixel positions for this context may be tracked in any manner.

The mean error generator module 166 has an output that provides an indication of the mean error for the context, denoted E(d,t). If the context C(d,t) has occurred before, then the mean error for the context is computed using the indication of the sum of the errors for this context and the indication of the occurrence count for this context (see step 168 (FIG. 11)). If the context C(d,t) has not occurred before, then the mean error for the context C(d,t) is zero.

The mean error for the context is supplied to an adder 170, which computes the sums of the mean error, E(d,t) and the initial prediction, pre-pred(X), for the object pixel, e.g.,:

$$\text{pred}(X) = \text{pred}(X) + E(d,t) \qquad \text{eq. (15)}$$

In addition, the error for the object prediction is computed as:

$$\Delta X = X - \text{pred}(X) \qquad \text{eq. (16)}$$

At steps 172, 174 (FIG. 11), the error for the object prediction is used to update the sum of errors for this context, and the occurrence count for this context is incremented.

Although disclosed above as using a mean adjustment, the adjustment is not limited to a mean but rather may use any adjustment which is substantially representative of the mean including but not limited to obvious modifications of mean which approximate the mean including, for example, addition of a constants to the mean, and scaling the mean by a constant, e.g., near unity.

Figure 12:
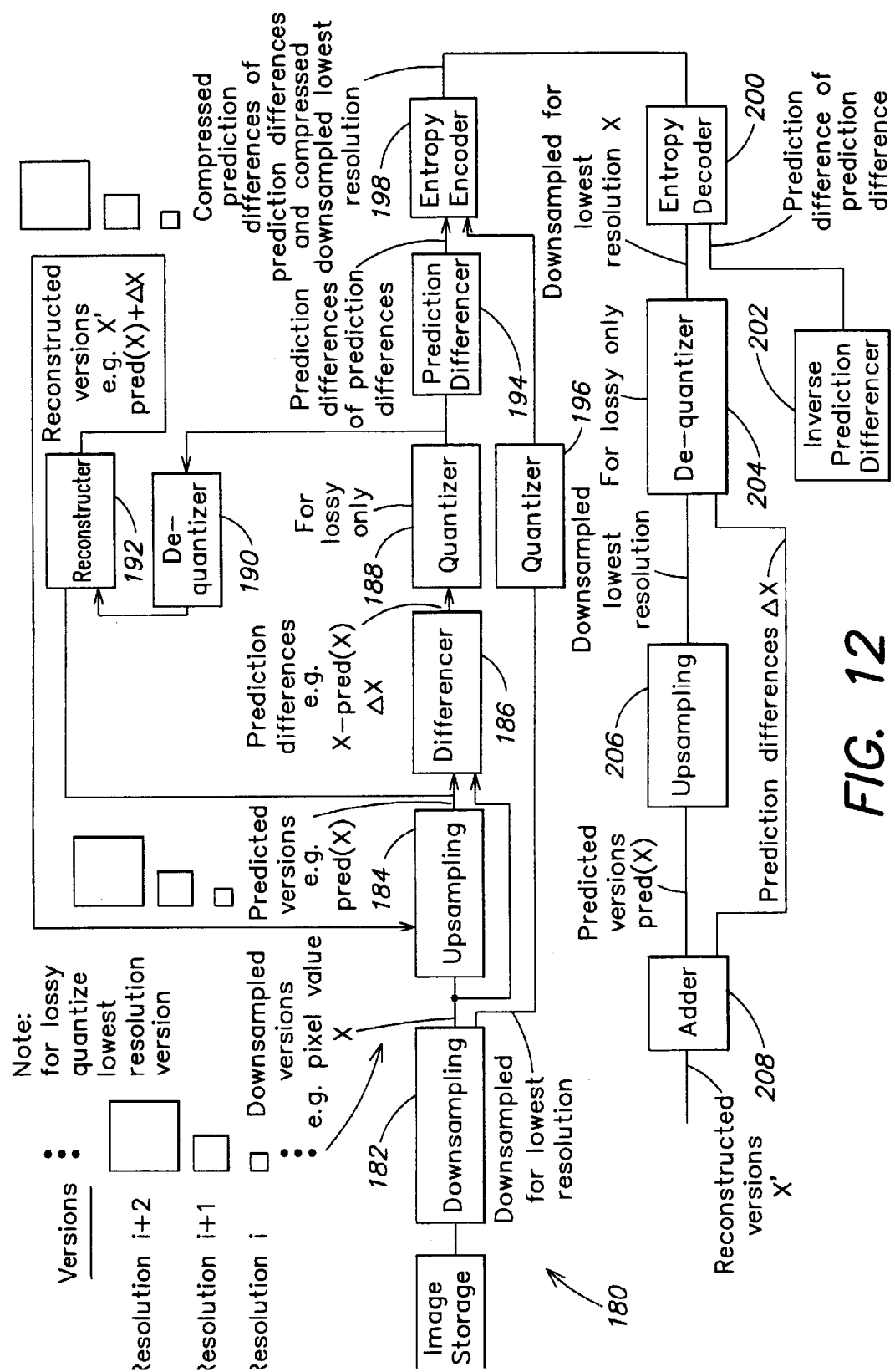
FIG. 12 is a schematic block diagram of another embodiment of a system for compressing and decompressing an image.

FIG. 12 illustrates an embodiment of a system for compressing and decompressing an image, in which a third aspect of the present invention is used. In this embodiment, prediction differences may be further processed. The additional processing may enhance compression by reducing redundancy in the data however, such advantage is not intended as a limitation on the present invention. The additional processing may use weighted sum of difference predictors and/or mean adjusted prediction, as described below.

The system 180 has a down sampling module 182, an upsampling module 184, a differencer module 186, a first quantizer module 188, a de-quantizer module 190, a reconstructor module 192, a prediction differencer module 194, a second quantizer module 196, an entropy encoder module 198, an entropy decoder module 200, an inverse prediction differencer module 202, a de-quantizer module 204, an upsampling module module 206, and an adder module 208.

Figure 13:
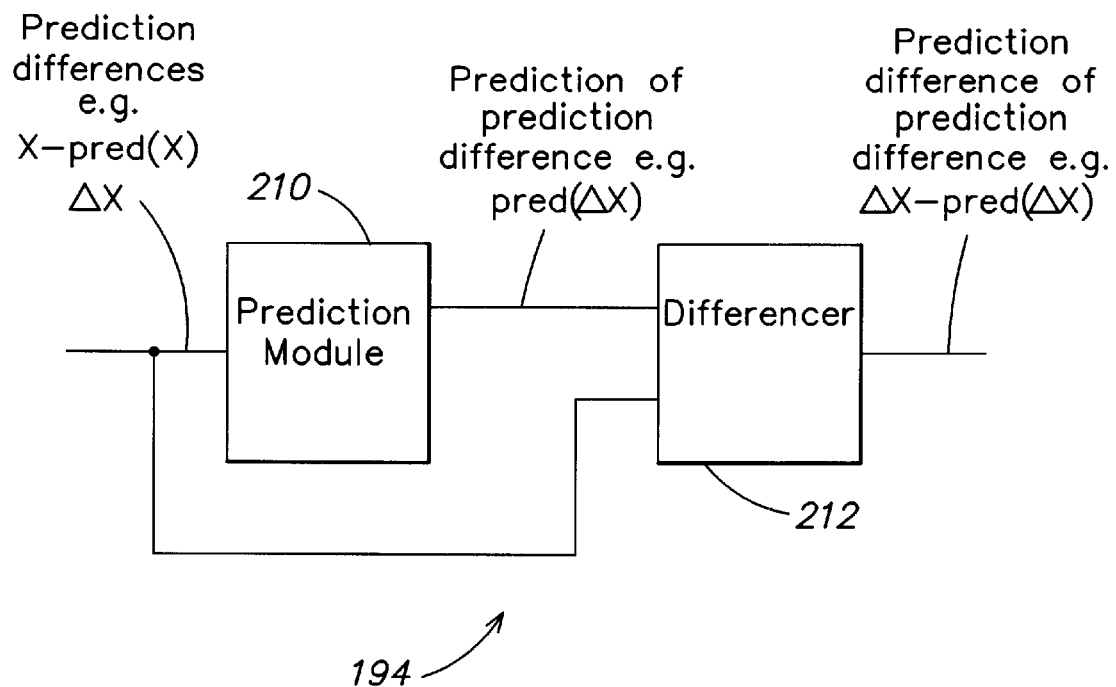
FIG. 13 is a schematic block diagram of one embodiment of the prediction differencer module of the system of FIG. 12.

FIG. 13 shows one embodiment of the prediction differencer module 194 of FIG. 12, which includes a prediction module 210 that receives data representative of prediction differences, e.g., ΔX. The prediction module 210 has an output that provides an indication of a prediction of a prediction difference, e.g., pred(ΔX), which is supplied to a first input of a differencer module 212. The differencer module 212 has a second input that receives the data representative of the prediction differences, e.g., ΔX, and has an output that provides an indication of a difference (referred to as prediction difference of prediction difference, e.g., ΔX−pred(ΔX)) between the prediction difference, e.g., ΔX, and the prediction of the prediction difference, e.g., pred (ΔX).

Figure 14:
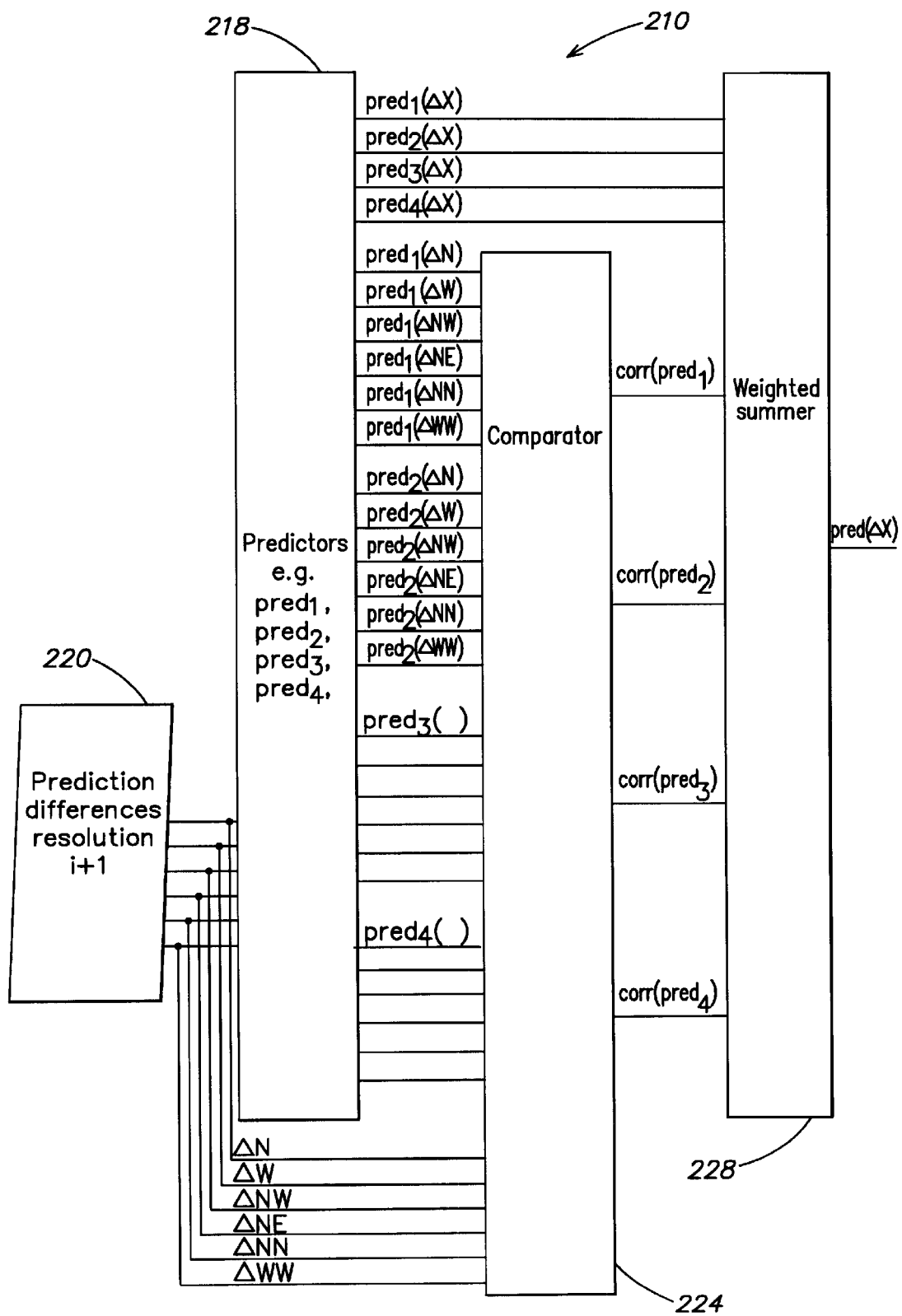
FIG. 14 is a schematic block diagram of one embodiment of a weighted summer for the prediction module of FIG. 13.
Figure 15:
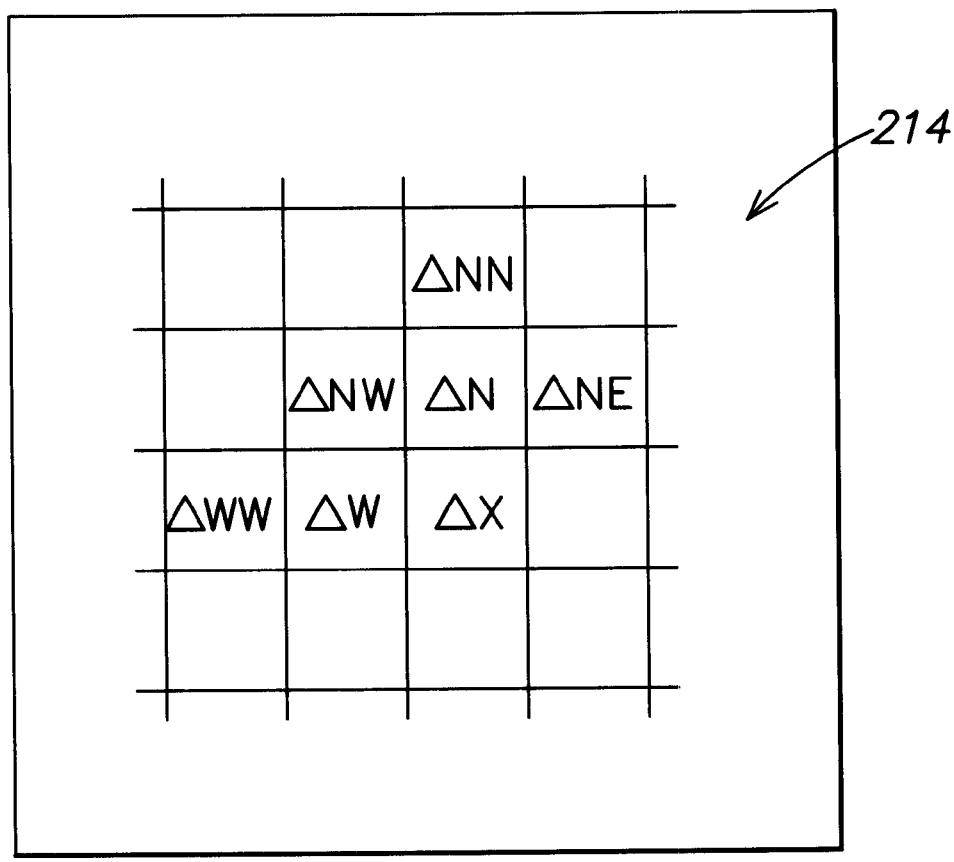
FIG. 15 is a representation predicted differences for a current resolution.
Figure 16:
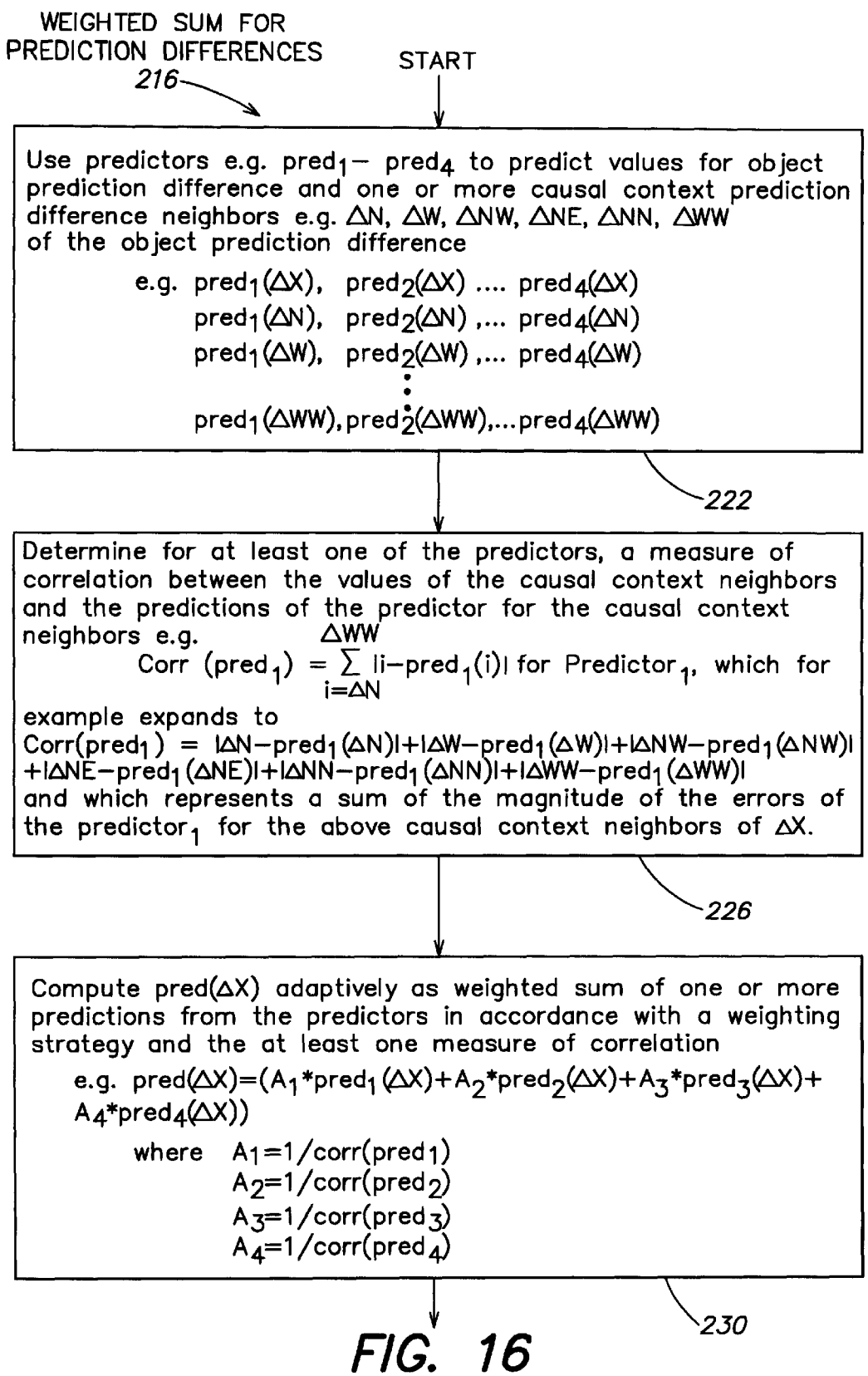
FIG. 16 is a flow chart diagram of one embodiment of the prediction module of FIG. 13.

FIG. 14 is a schematic block diagram of one embodiment of the prediction module 210 of FIG. 13. FIG. 15 is a representation 214 of predicted differences for a current resolution. FIG. 16 is a flow chart diagram 216 of one embodiment of the prediction module 210 of FIG. 13. Referring to FIG. 14, the prediction module includes a predictor module 218, which receives data 220 representative of prediction differences for a causal context prediction difference neighbors (i.e., one or more causal context prediction difference neighbors) e.g., ΔN, ΔW, ΔNW, ΔNE, ΔNN, ΔWW (FIG. 15) of an object prediction difference, e.g., ΔX (FIG. 15).

The predictor module 218 uses a plurality of predictors to generate predicted values for the object prediction difference, e.g., pred(ΔX) (FIG. 15), and to predict one or more causal context prediction difference neighbors e.g., ΔN, ΔW, ΔNW, ΔNE, ΔNN, ΔWW (FIG. 15), of the object prediction difference, as described below (see step 222 (FIG. 16)). The predictors may have any form including, but not limited to rules, processes, functions, formulas, equations, look up tables, mappings, etc., or any combination thereof. The predictors may reference any prediction difference values, for example the prediction differences may have any positional relation to the pixel or pixels being interpolated. The predictors may be obtained from any source; for example, the predictors may be specified by designers of the system, by one of the users of the sN stem or by anyone or anything else or any combination thereof Predictors may be predetermined or may be determined dynamically. One set of predictors may be uniformly applied to an image, or a set of predictors used for one portion of the image may be different than that used for one or more of the other portions of the image and/or that used for other images.

As stated above one or more predictors may be used. Example predictors include but are not limited to:
(note that example predictors 1–8 refer to pixels shown in FIG. 15)
1. ΔN
2. ΔW
3. ΔNW
4. ΔNE
5. ΔN+ΔW+ΔNW
6. Min(ΔN,ΔW), if ΔNW>=max(ΔN,ΔW)
Max (ΔN,ΔW), if ΔNW<=min(ΔN,ΔW)
ΔN+ΔW−ΔNW, else
7. 2ΔN−ΔNN
8. 2ΔW−ΔWW In this embodiment, the predictor module 218 has four predictors, e.g., $Pred_1$–$Pred_4$, which are used to predict values for object prediction difference $\Delta X$ (FIG. 15) and one or more causal context prediction difference neighbors e.g., $\Delta N$, $\Delta W$, $\Delta NW$, $\Delta NE$, $\Delta NN$, $\Delta WW$ (FIG. 15) of the object prediction difference.

The predictor module 218 has a plurality of outputs that provide indications of the predicted values, determined by the predictors, for the object prediction difference $\Delta X$ (FIG. 15), e.g., $pred_1(\Delta X)$, $pred_2(\Delta X)$ . . . $pred_4(\Delta X)$ The predictor module 218 also has a plurality of outputs that provide indications of the predicted values, determined by the predictors, for one or more of the causal context prediction difference neighbors e.g., $\Delta N$, $\Delta W$, $\Delta NW$, $\Delta NE$, $\Delta NN$, $\Delta WW$ (FIG. 15) of the object prediction difference, e.g., $pred_1(\Delta N)$, $pred_2(\Delta N)$, . . . $pred_4(\Delta N)$
$pred_1(\Delta W)$, $pred_2(\Delta W)$, . . . $pred_4(\Delta W)$
$pred_1(\Delta NW)$, $pred_2(\Delta NW)$, . . . $pred_4(\Delta NW)$
$pred_1(\Delta NE)$, $pred_2(\Delta NE)$, . . . $pred_4(\Delta NE)$
$pred_1(\Delta NN)$, $pred_2(\Delta NN)$, . . . $pred_4(\Delta NN)$
$pred_1(\Delta WW)$, $pred_2(\Delta WW)$, . . . $pred_4(\Delta WW)$ The predictions for the one or more causal context prediction difference neighbors are supplied to an input of a comparator module 224, which determines, for at least one of the predictors, a measure of correlation between the causal context prediction difference neighbors and the predictions of the predictor for the causal context neighbors (see step 226 (FIG. 16)). The measure of correlation may be determined in any manner, and may have any form. For example, the measure of correlation may be an absolute sense, or relative to one or more other predictors or any other measure, or any combination thereof. The measure of correlation may for example be any measure of correlation including but not limited to a difference, a ratio, or an absolute value. In this embodiment, the comparator module 224 uses equation (17):

$$Corr(pred_1) = \sum_{i=\Delta N}^{\Delta WW} |i - pred_1(i)| \text{ for } Predictor_1, \quad \text{eq. (17)}$$

which expands to $Corr(pred_1)=|\Delta N-pred_1(\Delta N)|+|\Delta W-pred_1(\Delta W)|+|\Delta NW-pred_1(\Delta NW)|+|\Delta NE-pred_1(\Delta NE)|+|\Delta NN-pred_1(\Delta NN)|+|\Delta WW-pred_1(\Delta WW)|$, and which represents a sum of the magnitude of the errors of the predictors for the above causal context prediction difference neighbors of $\Delta X$.

The comparator module 224 has a plurality of outputs that provide indications of the measures of correlation, denoted $corr(pred_1)$, $corr(pred_2)$, $corr(pred_3)$, $corr(pred_4)$, which are supplied to a weighted summer module 228.

The weighted summer module 228 has an output that provides an indication, denoted $pred(\Delta X)$, computed as weighted sum of one or more of the predictions in accordance with a weighting strategy and the at least one measure of correlation (see step 230 (FIG. 16)). The weighting strategy may be any strategy to influence, set establish, determine, cause, effect, and/or control a decision to use or not to use one or more of the predictions from the predictors and/or the weighting of the predictions from the predictors.

The weighting strategy may have any form including, but not limited to rules, processes, functions, formulas, equations, look up tables, mappings, etc., or any combination thereof. Many kinds of weighting strategies may be provided, and the invention is not limited to any particular weighting strategy. The weighting strategy may be obtained from any source; for example, the weighting strategy may be specified by designers of the system, by one of the users of the system or by anyone or anything else or any combination thereof. The weighting strategy may be predetermined or may be determined dynamically. The weighting strategy may be uniformly applied to an image, or a weighting strategy used for one portion of the image may be different than that used for one or more of the other portions of the image and/or that used for other images. Example weighting strategies include but are not limited to: choosing the most accurate, choosing more than one but less than all on the basis of the respective accuracy of each, using predetermined weights, using dynamically determined weights (e.g., assigning weights inversely proportional to error), and combinations thereof.

The weighting strategy in this embodiment is expressed by equation (18)

$$pred(\Delta X)=(A_1*pred_1(\Delta X)+A_2*pred_2(\Delta X)+A_3*pred_3(\Delta X)+A_4*pred_4(\Delta X)) \quad \text{eq. (18)}$$

The weights $A_1$, $A_2$, $A_3$, $A_4$, may, but need not, be determined adaptively, e.g. as the reciprocal of the error sum:

$A_1=1/corr(pred_1)$
$A_2=1/corr(pred_2)$
$A_3=1/corr(pred_3)$
$A_4=1/corr(pred_4)$ In addition, the prediction may be normalized, e.g., $$pred(\Delta X)=(A_1*pred_1(\Delta X)+A_2*pred_2(\Delta X)+ . . . )/sum(A_1A_2 . .eq.) \quad (19)$$

In another embodiment, one prediction may be selected and, used to generate the predictions, for example as expressed by equation (20):

$$pred(\Delta X)=pred_K(\Delta X), \text{ where } E_K=\min\{E_1, E_2, . . . \} \quad \text{eq. (20)}$$

In such embodiment, the weights of the non-selected predictions are essentially zero.

Figure 17:
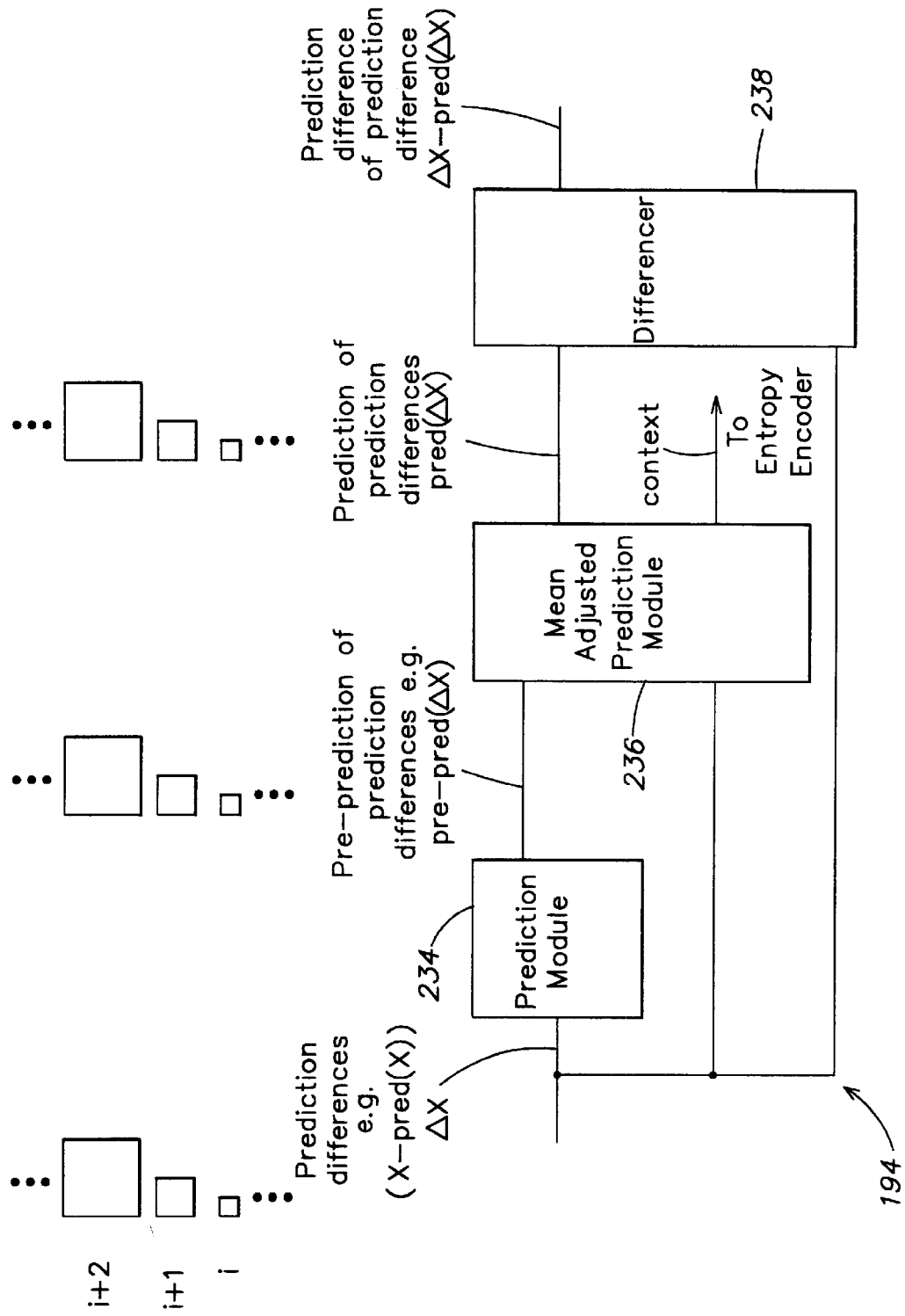
FIG. 17 is a schematic block diagram of another embodiment of the prediction differencer module of the system of FIG. 12.

FIG. 17 is a schematic block diagram of another embodiment of the predictions differencer module 194 of the system of FIG. 12, according to a fourth aspect of the present invention.

Referring now to FIG. 17, the prediction differencer module 194 comprises a prediction module 234, which has an input that receives indications of prediction differences 20 and an output that provides indications of preliminary predictions of prediction differences, e.g., denoted pre-pred $((\Delta X))$. The prediction module 234 may be any kind of predictions module, including but not limited to the prediction module described above with respect to FIGS. 13–16. The preliminary predictions of prediction differences, e.g., denoted pre-pred$((\Delta X))$, are supplied to one input of a mean adjusted prediction module 236. The mean adjusted prediction module has a second input that receives the prediction differences, and an output that provides an indication of prediction of prediction differences, e.g., $pred(\Delta X)$, which is supplied to a first input of a differencer module 238. The differencer module 238 has a second input that receives the data indicative of the prediction differences, e.g., $\Delta X$, and has an output that provides an indication of the prediction difference of prediction difference, e.g., $\Delta X-pred(\Delta X)$. The mean adjusted prediction module 238 has a second output that provides data indicative of the context, which is supplied to the entropy encoder 198 (FIG. 12)

Figure 18:
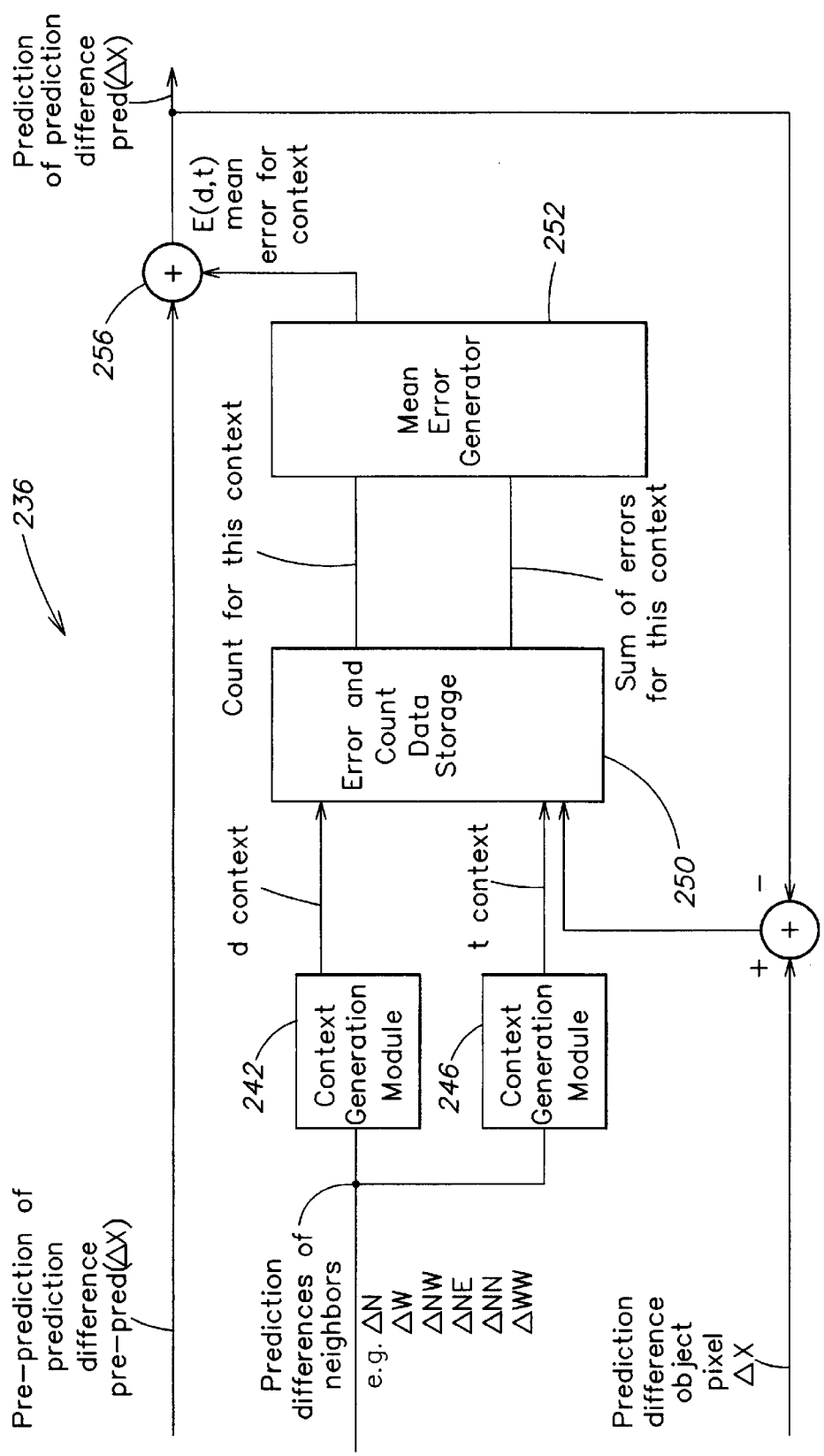
FIG. 18 is a schematic block diagram of the mean adjusted prediction module of FIG. 17.
Figure 19:
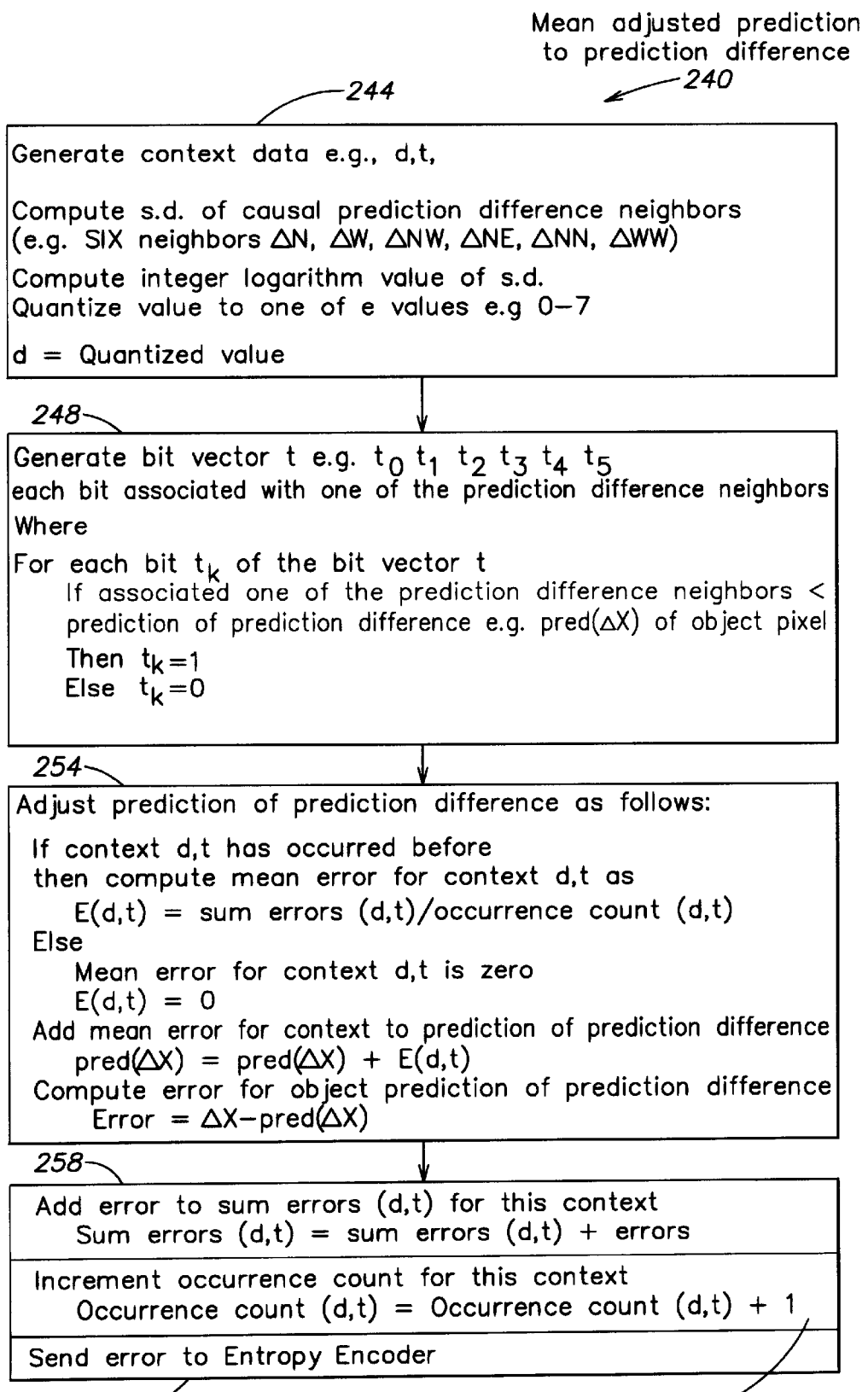
FIG. 19 is a flow chart diagram of one embodiment of the mean adjusted prediction module of FIG. 17.

FIG. 18 is a schematic block diagram of the mean adjusted prediction module 236 of FIG. 17. FIG. 19 is a flow chart diagram 240 of one embodiment of the mean adjusted prediction module 236 of FIG. 17.

Referring now to FIG. 18, the mean adjusted prediction module includes a first context generation module 242 which receives the data representative of the causal context prediction difference neighbors e.g., ΔN, ΔW, ΔNW, ΔNE, ΔNN, ΔWW (FIG. 15) of the object prediction difference, e.g., ΔX (FIG. 15). The first context generation module 242 generates data indicative of a context by classifying the neighborhood context of the causal context prediction difference neighbors e.g., ΔN, ΔW, ΔNW, ΔNE, ΔNN, ΔWW (FIG. 15).

The first context generation module 242 may use the following convention (see step 244 (FIG. 19)). Determine the standard deviation of causal prediction difference neighbors (e.g., six neighbors ΔN, ΔW, ΔNW, ΔNE, ΔNN, ΔWW (FIG. 15)). Determine the integer logarithm value of the standard deviation. Quantize the integer logarithm value to one of 8 values e.g., 0–7. The first context generation module has an output that provides an indication, denoted d, of the quantized value. The indication d may be supplied to the entropy encoder.

The mean adjusted prediction module further includes a second context generation module 246 having an input that receives the data representative of the causal context prediction difference neighbors e.g., ΔN, ΔW, ΔNW, ΔNE, ΔNN, ΔWW (FIG. 15) of the object prediction difference, e.g., ΔX (FIG. 15).

The second context generation module 246 has an output that provides an indication, denoted t, of the context of these causal context neighbors. In this embodiment, the context of these causal context neighbors is determined as described below (see step 248 (FIG. 19)). Generate bit vector t e.g., $t_0 t_1 t_2 t_3 t_4 t_5$, where each bit is associated with one of the causal context prediction difference neighbors e.g., ΔN, ΔW, ΔNW, ΔNE, ΔNN, ΔWW (FIG. 15), and where each bit $t_K$ of the bit vector t has a value determined as follows. If the associated one of the prediction difference neighbors<prediction of prediction difference e.g., pre (ΔX) of object prediction difference, then $t_K=1$, otherwise, $t_K=0$.

The indications d and t represent a context denoted by C(d,t). Note that there are a total of $8 \times 2_6 = 512$ contexts. The indications d and t are supplied to an error and count data storage module 250. The error and count data storage module 250 has an output that provides an indication of a sum of errors for this context and an indication of an occurrence count for this context, which are supplied to a mean error generator module 252. The mean of the prediction errors seen for this context may be tracked in any manner.

The mean error generator module 252 has an output that provides an indication of the mean error for the context, denoted E(d,t). If the context C(d,t) has occurred before, then the mean error for the context is computed using the indication of the sum of the errors for this context and the indication of the occurrence count for this context (see step 254 (FIG. 19)). If the context C(d,t) has not occurred before, then the mean error for the context C(d,t) is zero. The mean error for the context is supplied to an adder module 256, which computes the sums of the mean error for context, E(d,t) and the prediction of prediction difference for the object prediction difference:

$$\text{pred}(\Delta X) = \text{pred}(\Delta X) + E(d,t) \qquad \text{eq. (21)}$$

In addition an error for object prediction of prediction difference is computed as $$\text{Error} = \Delta X - \text{pred}(\Delta X) \qquad \text{eq. (22)}$$

The error for the prediction is used to update the sum of errors for this context, and the occurrence count for this context is incremented (see step 258–260 (FIG. 19))

Although disclosed above as using a mean adjustment, the adjustment is not limited to a mean but rather may use any adjustment which is substantially representative of the mean including but not limited to obvious modifications of mean which approximate the mean including, for example, addition of a constants to the mean, and scaling the mean by a constant, e.g., near unity.

Although the present invention has been described with respect to embodiments having equations, any other suitable method may be used including but not limited to using a look-up table. When a look up table is used, some round off errors will typically occur due to the presence of discrete values in the look up table.

Although the present invention has been described with respect to embodiments having equations for performing the interpolation, any other suitable method for performing the interpolation may be used including but not limited to using a look-up table. When a look up table is used, some round off errors will typically occur due to the presence of discrete values in the look up table. In addition, the types of interpolation are not limited to the equations above.

The present invention is not limited to the classification criteria that are disclosed above, or even the use of classifiers generally. Various methods for classifying image content are known. Any kind of classification criteria may be provided. Thus, other devices and/or methods may be used to detect the presence of the image content described above. Other methods for classifying an image include but are not limited to segmentation, i.e., connected component analysis, Furthermore, the classifier need not employ linguistic variables. For example, any method may be used to determining whether the image content of the first portion of the image includes an edge and/or determine whether an edge extends from a side of the first portion of the image to an opposite side of the first portion of the image. Furthermore, any method may be used to determine whether there is a specified measure of correlation along a line or along a spatial direction. The line and/or spatial direction need not be predetermined. In addition, the classifier may be used to detect the presence of other types of image content. The classification may but need not be based on image content criteria perceptible to the human eye.

The present invention may employ sequential processing, parallel processing, or any combination thereof.

The system, which may include but is not limited to the downsampler, the upsampler, the differencer, the reconstructor, the quantizer, the entropy encoder, the entropy decoder, the de-quantizer, the upsampler in the decoder portion, and the adder, may be implemented in software or hardware or firmware, or any combination thereof. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object oriented programming languages, and combinations thereof.

Each module or step described above and/or shown in the accompanying figures may correspond to separate modules of a computer program, or may be separate computer programs. Such modules may be operable on separate computers or other devices.

A computer system with which the various elements of the system of FIG. 1 may be implemented either individually or in combination typically includes at least one main unit connected to both an output device which displays information to a user and an input device which receives input from a user. The main unit may include a processor connected to a memory system via an interconnection mechanism. The input device and output device are also connected to the processor and memory system via the interconnection mechanism.

The invention is not limited to a particular computer platform, particular processor, or a particular programming language. Additionally, the computer system may be a multiprocessor computer system or may include multiple computers connected over a computer network.

One or more output devices may be connected to the image enlarging system. Example output devices include cathode ray tubes (CRT) display, liquid crystal displays (LCD) and other video output devices, printers, communication devices such as a modem, storage devices such as a disk or tape, and audio output. One or more input devices may be connected to the computer system. Example input devices include a keyboard, a keypad, trackball, mouse, pen and tablet, communication device, and data input devices such as audio and video capture devices. The invention is not limited to the particular input or output devices used in combination with the computer system or to those described herein. The computer system may be a general purpose computer system which is programmable using a computer programming language such as C, C++, java, or other language, such as a scripting language or even assembly language. The computer system may also be specially programmed, special purpose hardware, or an application-specific integrated circuit (ASIC).

In a general purpose computer system, the microprocessor may or may not execute a program called an operating system, which controls the execution of other computer programs and provides scheduling, debugging, input/output control, accounting, compilation, storage assignment, data management, communication control, and/or related services. The processor and operating system define computer platforms for which application programs and high level programming languages are written. A memory system typically includes a computer-readable and writable non-volatile recording medium, of which a magnetic disk, a flash memory, and tape are examples. The disk may be removable, known as a floppy disk, or permanent, known as a hard drive. Typically, in operation, the processor causes data to be read from the non-volatile recording medium into an integrated circuit memory element, which is typically a volatile, random access memory, such as a dynamic random access memory (DRAM) or static memory (SRAM). The processor generally manipulates the data within the integrated circuit memory and then copies the data to the disk after processing is completed. A variety of mechanisms are known for managing data movement between the disk and the integrated circuit memory element, and the invention is not limited thereto. The invention is not limited to a particular memory system.

Having thus described the invention with respect to several embodiments, various alterations, modifications, and improvements will occur to those skilled in the art. Such alterations, modifications, and improvements are intended to be within the spirit and scope of the invention. Accordingly, the foregoing description is by way of example only and is not intended as limiting the invention is limited only as defined the: following claims and the equivalents thereto.

What is claimed is:

1. A method for use in processing data representative of an image, the method comprising the steps of:

receiving data indicative of one or more reconstructed versions of the image including data representative of a causal context of an object pixel of the image;

generating a plurality of predictions for the object pixel and a plurality of predictions for at least one pixel of the causal context;

determining at least one measure of correlation between the plurality of predictions for the at least one pixel of the causal context and the data representative of the causal context; and determining a prediction for the object pixel computed as a weighted sum of one or more of the plurality of predictions for the object pixel, in accordance with the at least one measure of correlation and a weighting policy.

2. An apparatus for use in processing data representative of an image, the apparatus comprising:

means for receiving data indicative of one or more reconstructed versions of the image including data representative of a causal context of an object pixel of the image;

means for generating a plurality of predictions for the object pixel and a plurality of predictions for at least one pixel of the causal context;

means for determining at least one measure of correlation between the plurality of predictions for the at least one pixel of the causal context and the data representative of the causal context; and means for determining a prediction for the object pixel computed as a weighted sum of one or more of the plurality of predictions for the object pixel, in accordance with the at least one measure of correlation and a weighting policy.

3. A method for use in processing data representative of an image, the method comprising the steps of:

receiving data representative of a prediction of an object pixel;

receiving data representative of a plurality of reconstructed versions of an image including data representative of two or more causal contexts of the image from two or more resolutions of the image;

determining a context for the two or more causal contexts;

determining a substantially mean error for the context; and determining a prediction for the object pixel in accordance with the data representative of the prediction for the object pixel and the substantially mean error for the context.

4. An apparatus for use in processing data representative of an image, the apparatus comprising:

means for receiving data representative of a prediction of an object pixel;

means for receiving data representative of a plurality of reconstructed versions of an image including data representative of two or more causal contexts of the image from two or more resolutions of the image;

means for determining a context for the two or more causal contexts;

means for determining a substantially mean error for the context; and means for determining a prediction for the object pixel in accordance with the data representative of the prediction for the object pixel and the substantially mean error for the context.

5. A method for use in processing data representative of an image, the method comprising the steps of:

receiving data representative of one or more prediction differences versions of the image including data representative of a causal context prediction difference of an object predictions difference of the image;

generating a plurality of predictions for the object prediction difference and a plurality of predictions for at least one prediction difference of the causal context;

determining at least one measure of correlation between the plurality of predictions for the at least one prediction difference and the data representative of the causal context predictions difference; and determining a prediction for the object prediction difference computed as a weighted sum of one or more of the plurality of predictions for the object prediction difference, in accordance with the at least one measure of correlation and a weighting policy.

6. An apparatus for use in processing data representative of an image, the apparatus comprising:

means for receiving data representative of one or more prediction differences versions of the image including data representative of a causal context prediction difference of an object prediction difference of the image;

means for generating a plurality of predictions for the object prediction difference and a plurality of predictions for at least one prediction difference of the causal context;

means for determining at least one measure of correlation between the plurality of predictions for the at least one prediction difference and the data representative of the causal context prediction difference; and means for determining a prediction for the object prediction difference computed as a weighted sum of one or more of the plurality of predictions for the object prediction difference, in accordance with the at least one measure of correlation and a weighting policy.

7. A method for use in processing data representative of an image, the method comprising the steps of:

receiving data representative of a prediction of an object prediction difference;

receiving data representative of a plurality of reconstructed versions of an image including data representative of two or more causal contexts of the image from two or more resolutions of the image;

determining a context for the two or more causal contexts;

determining a substantially mean error for the context; and determining a prediction for the object prediction difference in accordance with the data representative of the prediction for the object prediction difference and the substantially mean error for the context.

8. An apparatus for use in processing data representative of an image, the apparatus comprising:

means for receiving data representative of a prediction of an object predictions difference;

means for receiving data representative of a plurality of reconstructed versions of an image including data representative of two or more causal contexts of the image from two or more resolutions of the image;

means for determining a context for the two or more causal contexts;

means for determining a substantially mean error for the context; and means for determining a prediction for the object prediction difference in accordance with the data representative of the prediction for the object prediction difference and the substantially mean error for the context.

* * * * *